(12) United States Patent
Matsumoto et al.

(10) Patent No.: US 7,689,048 B2
(45) Date of Patent: Mar. 30, 2010

(54) IMAGE ENCODING APPARATUS, METHOD, AND COMPUTER-READABLE STORAGE MEDIUM FOR ENCODING A PIXEL VALUE

(75) Inventors: Yuki Matsumoto, Kanagawa-Ken (JP); Hiroshi Kajiwara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 971 days.

(21) Appl. No.: 11/415,079

(22) Filed: May 2, 2006

(65) Prior Publication Data

US 2006/0262982 A1  Nov. 23, 2006

(30) Foreign Application Priority Data

May 19, 2005  (JP)  ............................. 2005-146984

(51) Int. Cl.
*G06K 9/36* (2006.01)
(52) U.S. Cl. ..................................... 382/232
(58) Field of Classification Search ................. 382/232
See application file for complete search history.

(56) References Cited

U.S. PATENT DOCUMENTS

| | | | | |
|---|---|---|---|---|
| 5,650,829 A * | 7/1997 | Sugimoto et al. | ........... | 348/699 |
| 5,808,700 A * | 9/1998 | Sugimoto et al. | ........... | 348/699 |
| 5,945,930 A | 8/1999 | Kajiwara | ..................... | 341/50 |
| 6,028,963 A | 2/2000 | Kajiwara | ..................... | 382/239 |
| 6,031,938 A | 2/2000 | Kajiwara | ..................... | 382/239 |
| 6,097,364 A | 8/2000 | Miyamoto et al. | ............ | 345/97 |
| 6,101,282 A | 8/2000 | Hirabayashi et al. | ........ | 382/246 |
| 6,233,355 B1 | 5/2001 | Kajiwara | ..................... | 382/238 |
| 6,292,587 B1 * | 9/2001 | Toho | .......................... | 382/238 |
| 6,310,980 B1 | 10/2001 | Kajiwara | ..................... | 382/238 |
| 6,501,859 B1 | 12/2002 | Kajiwara | ..................... | 382/239 |
| 6,549,676 B1 | 4/2003 | Nakayama et al. | .......... | 382/246 |
| 6,560,365 B1 | 5/2003 | Nakayama et al. | .......... | 382/233 |
| 6,665,444 B1 | 12/2003 | Kajiwara | ..................... | 382/240 |
| 6,711,295 B2 | 3/2004 | Nakayama et al. | .......... | 382/232 |
| 6,768,819 B2 | 7/2004 | Yamazaki et al. | ........... | 382/240 |
| 6,847,735 B2 | 1/2005 | Kajiwara et al. | ............ | 382/233 |
| 6,879,726 B2 | 4/2005 | Sato et al. | .................... | 382/239 |
| 6,879,727 B2 | 4/2005 | Sato et al. | .................... | 382/239 |
| 6,917,716 B2 | 7/2005 | Kajiwara et al. | ............ | 382/240 |
| 6,947,600 B1 | 9/2005 | Sato et al. | .................... | 382/233 |
| 6,985,630 B2 | 1/2006 | Kajiwara | ..................... | 382/233 |
| 7,013,050 B2 | 3/2006 | Kajiwara | ..................... | 382/240 |
| 7,031,536 B2 | 4/2006 | Kajiwara | ..................... | 382/240 |

(Continued)

*Primary Examiner*—Bhavesh M Mehta
*Assistant Examiner*—David P Rashid
(74) *Attorney, Agent, or Firm*—Fitzpatrick, Cella, Harper & Scinto

(57) ABSTRACT

Image data is efficiently encoded using a predict coding unit and a run-length coding unit. The predict coding unit encodes a target pixel X on the basis of difference between the value of the target pixel and a predict value calculated from pixels neighboring the target pixel. The run-length coding unit starts the measuring the run when the number of colors contained in four pixels "a", "b", "c", and "d" near the target pixel X is 1, and outputs encoded data of the run when the target pixel is different from an immediately preceding pixel "a". Then, the predict coding unit starts the encoding. At this time, since the target pixel is different from the preceding pixel, the preceding pixel is excluded from references for generating the predict value. Instead of the preceding pixel, an pixel, which has been encoded, satisfying a specific condition is referred to.

8 Claims, 27 Drawing Sheets

U.S. PATENT DOCUMENTS

| | | | |
|---|---|---|---|
| RE39,984 E | 1/2008 | Kajiwara | 382/239 |
| 2004/0013312 A1 | 1/2004 | Kajiwara | 382/240 |
| 2004/0213347 A1 | 10/2004 | Kajiwara | 375/240.11 |
| 2005/0100226 A1 | 5/2005 | Kajiwara et al. | 382/232 |
| 2005/0249283 A1 | 11/2005 | Kajiwara et al. | 375/240.12 |
| 2006/0013304 A1 | 1/2006 | Maeda et al. | 375/240.11 |
| 2006/0045362 A1 | 3/2006 | Ito et al. | 382/232 |
| 2006/0210176 A1 | 9/2006 | Kajiwara et al. | 382/232 |
| 2007/0160299 A1 | 7/2007 | Kajiwara et al. | 382/240 |
| 2007/0217703 A1 | 9/2007 | Kajiwara | 382/238 |
| 2008/0089413 A1 | 4/2008 | Kishi et al. | 375/240.13 |

* cited by examiner

FIG. 4

| PREDICTION SELECTION SIGNAL m | PREDICTION EQUATION |
| --- | --- |
| 0 | NONE |
| 1 | p=a |
| 2 | p=b |
| 3 | p=c |
| 4 | p=a+b−c |
| 5 | p=a+((b−c)/2) |
| 6 | p=b+((a−c)/2) |
| 7 | p=(a+b)/2 |

FIG. 5

| SSSS | PREDICTION ERROR e |
|---|---|
| 0 | 0 |
| 1 | −1, 1 |
| 2 | −3, −2, 2, 3 |
| 3 | −7~−4, 4~7 |
| 4 | −15~−8, 8~15 |
| 5 | −31~−16, 16~31 |
| 6 | −63~−32, 32~63 |
| 7 | −127~−64, 64~127 |
| 8 | −255~−128, 128~255 |
| 9 | −511~−256, 256~511 |
| 10 | −1023~−512, 512~1023 |
| 11 | −2047~−1024, 1024~2047 |
| 12 | −4095~−2048, 2048~4095 |
| 13 | −8191~−4096, 4096~8192 |
| 14 | −16383~−8192, 8192~16383 |
| 15 | −32767~−16384, 16384~32767 |
| 16 | 32768 |

FIG. 6

| SSSS | CODE WORD |
|---|---|
| 0 | 00 |
| 1 | 010 |
| 2 | 011 |
| 3 | 100 |
| 4 | 101 |
| 5 | 110 |
| 6 | 1110 |
| 7 | 11110 |
| 8 | 111110 |
| 9 | 1111110 |
| 10 | 11111110 |
| 11 | 111111110 |
| 12 | 1111111110 |
| 13 | 11111111110 |
| 14 | 111111111110 |
| 15 | 1111111111110 |
| 16 | 1111111111111 |

FIG. 7

| VECTOR INFORMATION | CODE WORD |
|---|---|
| 0 | 00 |
| 1 | 10 |
| 2 | 110 |
| 3 | 111 |

FIG. 8A FOR NEIGHBORING PIXEL STATE INFORMATION="0"

| CODE WORD OF VECTOR INFORMATION |
|---|

FIG. 8B FOR Nc≤3 AND NEIGHBORING PIXEL STATE INFORMATION="1"

| CODE WORD OF VECTOR INFORMATION | PREDICTED CODE WORD OF R COMPONENT | PREDICTED CODE WORD OF G COMPONENT | PREDICTED CODE WORD OF B COMPONENT |
|---|---|---|---|

FIG. 8C FOR Nc=4

| PREDICTED CODE WORD OF R COMPONENT | PREDICTED CODE WORD OF G COMPONENT | PREDICTED CODE WORD OF B COMPONENT |
|---|---|---|

FIG. 12

| Nc | VECTOR INFORMATION | | NEIGHBORING PIXEL STATE INFORMATION |
|---|---|---|---|
| 1 | FOR X=Xa, | 0 | 0 |
| 1 | FOR X≠Xa, | 1 | 1 |
| 2 | FOR X=X1, | 0 | 0 |
| 2 | FOR X=X2, | 1 | 0 |
| 2 | IN OTHER CASES, | 2 | 1 |
| 3 | FOR X=X1, | 0 | 0 |
| 3 | FOR X=X2, | 1 | 0 |
| 3 | FOR X=X3, | 2 | 0 |
| 3 | IN OTHER CASES, | 3 | 1 |
| 4 | UNCONDITIONALLY, | 4 | 1 |

FIG. 15A

| VECTOR INFORMATION | CODE WORD |
|---|---|
| 0 | 1 |
| 1 | 0 |

FOR Nc=1

FIG. 15B

| VECTOR INFORMATION | CODE WORD |
|---|---|
| 0 | 1 |
| 1 | 01 |
| 2 | 00 |

FOR Nc=2

FIG. 15C

| VECTOR INFORMATION | CODE WORD |
|---|---|
| 0 | 01 |
| 1 | 001 |
| 2 | 000 |
| 3 | 1 |

FOR Nc=3

FIG. 16

| k \ v | 0 VARIABLE LENGTH PART | 0 FIXED-LENGTH PART | 1 VARIABLE LENGTH PART | 1 FIXED-LENGTH PART | 2 VARIABLE LENGTH PART | 2 FIXED-LENGTH PART | 3 VARIABLE LENGTH PART | 3 FIXED-LENGTH PART |
|---|---|---|---|---|---|---|---|---|
| 0 | 1 | | 1 | 0 | 1 | 00 | 1 | 000 |
| 1 | 01 | | 1 | 1 | 1 | 01 | 1 | 001 |
| 2 | 001 | | 01 | 0 | 1 | 10 | 1 | 010 |
| 3 | 0001 | | 01 | 1 | 01 | 11 | 1 | 011 |
| 4 | 00001 | | 001 | 0 | 01 | 00 | 1 | 100 |
| 5 | 000001 | | 001 | 1 | 01 | 01 | 1 | 101 |
| 6 | 0000001 | | 0001 | 0 | 01 | 10 | 1 | 110 |
| 7 | 00000001 | | 0001 | 1 | 01 | 11 | 1 | 111 |
| 8 | 000000001 | | 00001 | 0 | 001 | 00 | 01 | 000 |
| ⋮ | ⋮ | | ⋮ | ⋮ | ⋮ | ⋮ | ⋮ | ⋮ |

FIG. 20

| PIXEL VALUE | | | APPEARANCE FREQUENCY |
|---|---|---|---|
| R | G | B | |
| 0 | 0 | 0 | 5 |
| 128 | 0 | 0 | 4 |
| 0 | 128 | 32 | 2 |
| 255 | 255 | 255 | 2 |
| ⋮ | | | ⋮ |

FIG. 23

| PIXEL VALUE Xa | | | PIXEL VALUE Xf | | |
|---|---|---|---|---|---|
| R | G | B | R | G | B |
| 0 | 0 | 0 | 255 | 255 | 255 |

IMAGE ENCODING APPARATUS, METHOD, AND COMPUTER-READABLE STORAGE MEDIUM FOR ENCODING A PIXEL VALUE

FIELD OF THE INVENTION

The present invention relates to a technique of encoding image data.

BACKGROUND OF THE INVENTION

As a conventional image coding method, a predictive encoding-based method has been proposed. The predictive coding method comprises a sequence conversion unit which converts image data into a prediction error by predictive transform, and an entropy encoding unit which converts the prediction error output from the sequence conversion unit into encoded data of less redundancy.

As an example of a scheme using predictive encoding, an international standard JPEG-LS (ITU-T T.87|ISO/IEC 14495-1) is known.

JPEG (ITU-T T.81|ISO/IEC 10918-1) defines a lossless coding scheme in which an independent function is based on predictive coding. This lossless coding scheme will be called a JPEG lossless coding mode. In the JPEG lossless coding mode, seven prediction equations are defined as a method of predicting the value of a pixel of interest (target pixel) from neighboring pixels, and the prediction method can be selected in accordance with an image.

FIG. 2 is a block diagram showing a conventional image processing apparatus. FIG. 2 shows an example of the apparatus which losslessly compresses an image in the above-described JPEG lossless coding mode. In FIG. 2, reference numeral 201 denotes a buffer; 202, a component value prediction unit; 203, a subtracter; 204, a Huffman table memory; 205, a prediction error encoding unit; 209, a code stream formation unit; and 206, 207, and 208, signal lines.

The Huffman table memory 204 stores a Huffman table for use in the prediction error encoding unit 205. Assume that the Huffman table memory 204 stores a Huffman table shown in FIG. 6.

The flow of a process when a conventional image processing apparatus encodes an RGB color image whose components each are expressed by 8 bits will be explained with reference to FIG. 2.

A prediction selection signal m for selecting a prediction method for use in the component value prediction unit 202 is input from the signal line 208. The prediction selection signal m takes an integer value of 0 to 7, and the respective values correspond to different prediction equations. When one image is encoded, the prediction selection signal m does not change and is fixed. FIG. 4 shows the correspondence between the prediction equation for use and the prediction selection signal m. When the prediction selection signal m is 0, no prediction equation is defined. This means that each component is directly encoded without performing any predictive transform. Symbols "p", "a", "b", and "c" in FIG. 4 will be explained below.

Image data are sequentially input from the signal line 206. The image data input order is the raster scan order, and component data of each pixel are input in the order of R, G, and B. The R, G, and B components are defined as component numbers of 0, 1, and 2, respectively. The upper left corner of an image is defined as coordinates (0,0), and the value of the component number C of a pixel at the horizontal pixel position x and vertical pixel position y is represented by P(x,y,C).

For example, when a pixel at the position (x,y)=(3,4) has (R,G,B)=(255,128,0), P(3,4,0)=255, P(3,4,1)=128, and P(3,4,2)=0.

The buffer 201 has a capacity for storing image data of two lines that are input from the signal line 206.

When the component value x of the pixel of interest=P(x,y,C), the component value prediction unit 202 extracts, from the buffer 201, the value "a" of the same component of an immediately preceding pixel=P(x−1,y,C), the value "b" of the same component of a pixel before one line=P(x,y−1,C), and the value "c" of the same component of an obliquely upper left pixel=P(x−1,y−1,C). The component value prediction unit 202 generates a predicted value "p" in accordance with the prediction scheme selection signal m. FIG. 3 shows the positional relationship between "a", "b", "c", and the component value x of the pixel of interest. Note that when "a", "b", and "c" are outside an image, they are set to 0.

The subtracter 203 calculates the difference value between the predicted value p and the component value x to be encoded, and outputs it as a prediction error e.

The prediction error encoding unit 205 classifies prediction errors e input from the subtracter 203 into a plurality of groups, and generates a group number SSSS and overhead bits of a bit length defined for each group. FIG. 5 shows the relationship between the prediction error e and the group number SSSS. The overhead bits are information for specifying a prediction error in the group, and the bit length is given by the group number SSSS. Note that the bit length is exceptionally 0 for SSSS=16 (when the precision of each component is 8 bits, SSSS=16 is not generated). If the prediction error e is positive, the lower SSSS bits of the prediction error e become overhead bits; if the prediction error e is negative, the lower SSSS bits of e−1 become overhead bits. The MSB (Most Significant Bit) of overhead bits is 1 for a positive prediction error e and 0 for a negative prediction error e. In an encoding process, encoded data corresponding to the group number SSSS is output by looking up the Huffman table stored in the Huffman table memory 204. When SSSS is neither 0 nor 16, overhead bits of a bit length defied by the group number are output.

The code stream formation unit 209 forms a code stream of a format complying with the JPEG standard from encoded data output from the prediction error encoding unit 205, and additional information (e.g., the prediction selection signal m input via the signal line 208, the numbers of horizontal and vertical pixels of an image, the number of components which form a pixel, and the precision of each component). The code stream formation unit 209 outputs the code stream to the signal line 207.

In addition to predictive encoding, run-length encoding is also known. According to run-length encoding, when a pixel of interest matches a previously encoded pixel, information representing the number of matched pixels is encoded. This encoding has high encoding efficiency when identical pixels run in an image.

The purpose of encoding is to reduce the data amount of an original image, and that of lossless coding is to generate a code which can be completely decoded into an original image. When one image is losslessly encoded, it is more desirable to locally use the predictive encoding technique and run-length encoding technique than to apply only one of them.

However, a method of efficiently encoding data while these encoding techniques are switched and used has not been established.

SUMMARY OF THE INVENTION

The present invention has been made in consideration of the above situation, and has as its object to provide a technique of efficiently coding data when encoding is executed selectively using encoding of each pixel and run-length coding.

In order to solve the above problems, an image encoding apparatus according to the present invention has the following arrangement.

That is, there is provided an image encoding apparatus which encodes a pixel value, comprising:

a first encoding unit which encodes a value of a target pixel by using a value of an encoded pixel;

a second encoding unit which counts, as a run, a number by which the target pixel and an immediately preceding pixel have the same value, and outputs encoded data based on the counted run; and a switching unit which switches between encoding by the first encoding unit and encoding by the second encoding unit, wherein when the value of the pixel immediately before the target pixel is encoded by the second encoding unit, the first encoding unit encodes the target pixel by using a value of an encoded pixel including no immediately preceding pixel, and when the value of the immediately preceding pixel is not encoded by the second encoding unit, encodes the target pixel by using a value of an encoded pixel including the immediately preceding pixel.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a table showing a prediction equation corresponding to a prediction selection signal m;

FIG. 5 is a table showing the correspondence between a prediction error e and a group number SSSS;

FIG. 6 is a table showing the correspondence between the group number SSSS and a code word;

FIG. 7 is a table showing an example of the correspondence between vector information and the code word;

FIGS. 8A to 8C are views each showing the data structure of pixel-encoded data in the embodiment;

FIG. 12 is a table showing the correspondence between vector information and neighboring pixel state information in the embodiment;

FIGS. 15A to 15C are tables each showing the relationship between vector information and the code for each color count Nc;

FIG. 16 is a table showing an example of Golomb encoding;

FIG. 20 is a table showing the state of a table during encoding in the second embodiment;

FIG. 23 is a table showing the data contents of a pixel Xa of interest and a pixel Xf which replaces the pixel Xa in the third embodiment;

DETAILED DESCRIPTION OF THE PREFERRED EMBODIMENTS

Preferred embodiments of the present invention will be described in detail below with reference to the accompanying drawings.

First Embodiment

Figure 1:
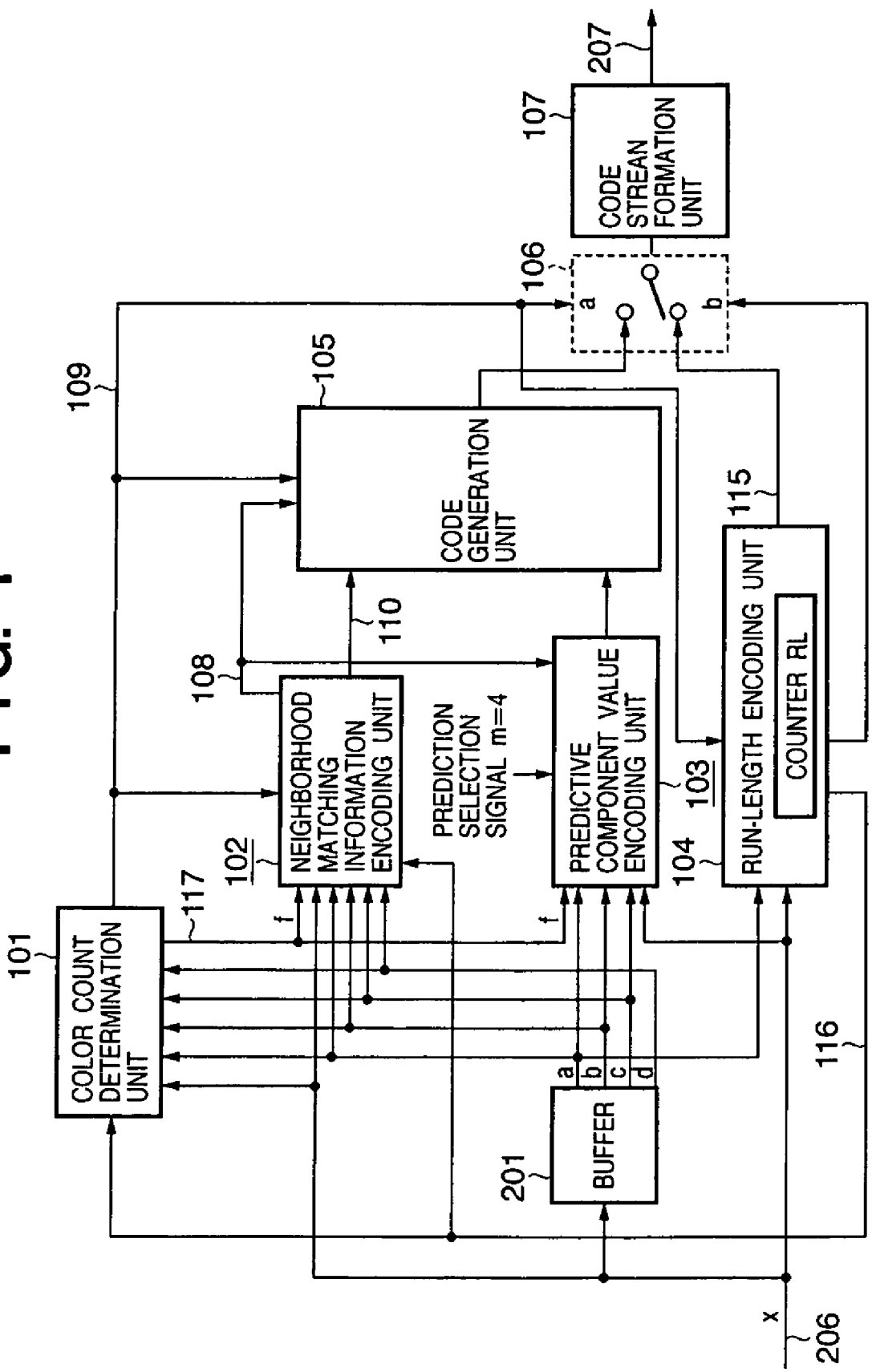
FIG. 1 is a block diagram showing an image processing apparatus according to the first embodiment.

FIG. 1 is a block diagram showing an image encoding apparatus according to the first embodiment. As shown in FIG. 1, the image processing apparatus according to the first embodiment comprises a color count determination unit 101, neighborhood matching information encoding unit 102, predictive component value encoding unit 103, run-length encoding unit 104, code generation unit 105, switch 106, code stream formation unit 107, and buffer 201. In FIG. 1, reference numerals 108, 109, 110, 206, and 207 denote signal lines. The same reference numerals denote blocks which perform the same operations as those of the processing blocks of the conventional image processing apparatus, and a description thereof will be omitted. An image encoding process in the apparatus of FIG. 1 will be explained. In the first embodiment, the prediction selection signal m=4.

Image data to be encoded by the image processing apparatus according to the first embodiment is image data of R, G, and B colors. Each component (color component) is formed from pixel data which expresses a luminance value of 0 to 255 by 8 bits (multi-value). Note that the first embodiment targets an RGB color image, but may be directed to an image having a plurality of components in one pixel (e.g., CMYK color image) or a monochrome multi-value image. Image data to be encoded has W horizontal pixels and H vertical pixels. Input image data has a data amount of W×H×3 bytes. The horizontal right direction is defined as the positive direction of the X-coordinate, and the vertical down direction is defined as the positive direction of the Y-coordinate. The input order of input image data is the raster order, and each pixel is formed by laying out data in the order of R, G, and B.

The operation of each unit in the image processing apparatus according to the first embodiment will be explained.

Image data to be encoded are sequentially input from the signal line 206, and stored in the buffer 201 (having a capacity of two lines). The input order of pixel data is the raster scan order, and component data of each pixel are input in the order of R, G, and B. The R, G, and B components are defined as component numbers of 0, 1, and 2, respectively. The upper left corner of an image is defined as coordinates (0,0), and the value of the component number C of a pixel at the horizontal right pixel position x and vertical lower pixel position y is represented by P(x,y,C). For example, when a pixel at the position (x,y)=(3,4) has (R,G,B)=(255,128,0), P(3,4,0)=255, P(3,4,1)=128, and P(3,4,2)=0.

Figure 24:
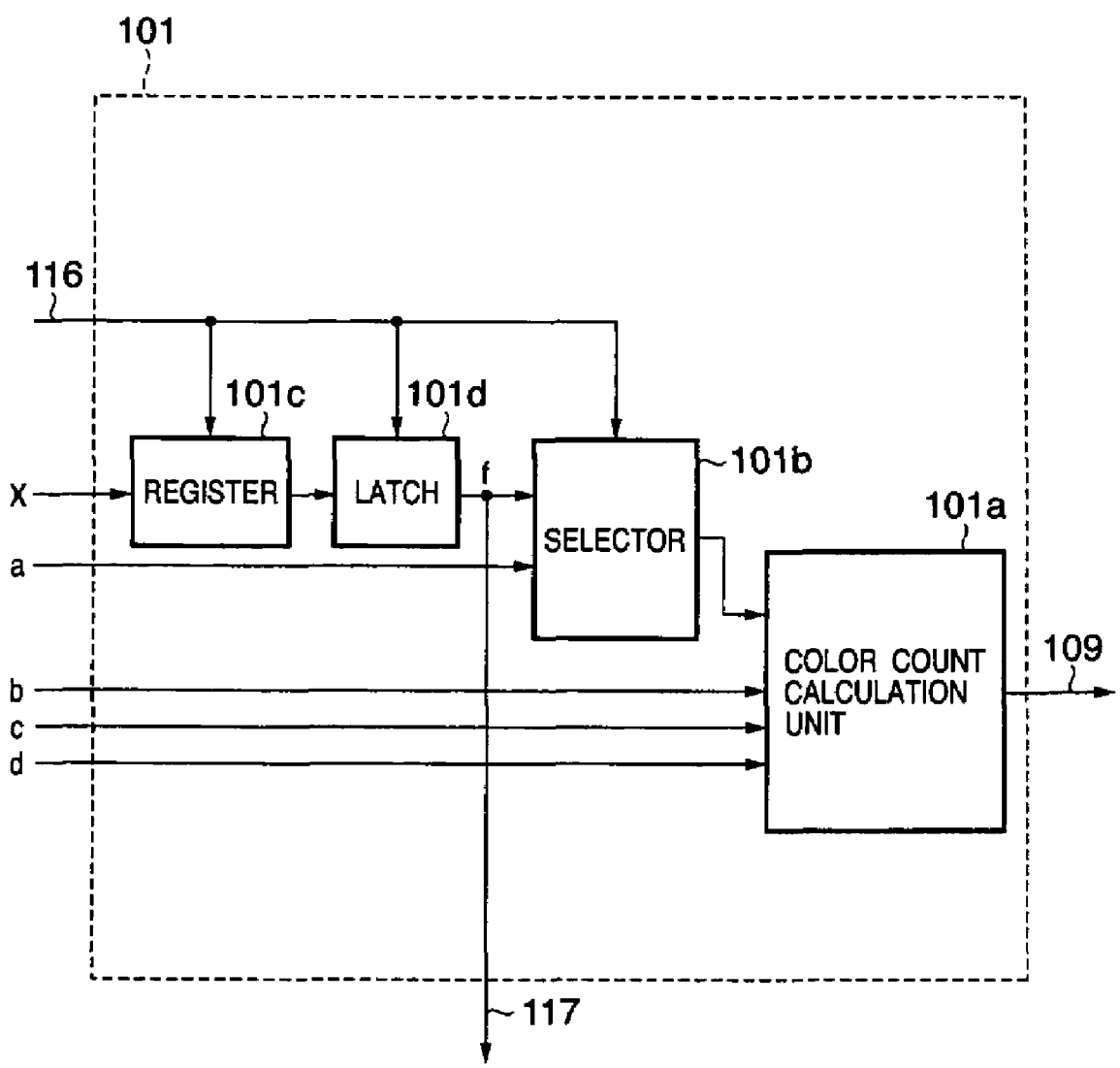
FIG. 24 is a block diagram showing a color count determination unit in the first embodiment.

As shown in FIG. 24, the color count determination unit 101 is made up of a color count calculation unit 101a, selector 101b, register 101c, and latch 101d. Details of the register 101c, latch 101d, and selector 101b will be described later. In the following description, the selector 101b selects data "a" and outputs it to the color count calculation unit 101a.

Figure 3:
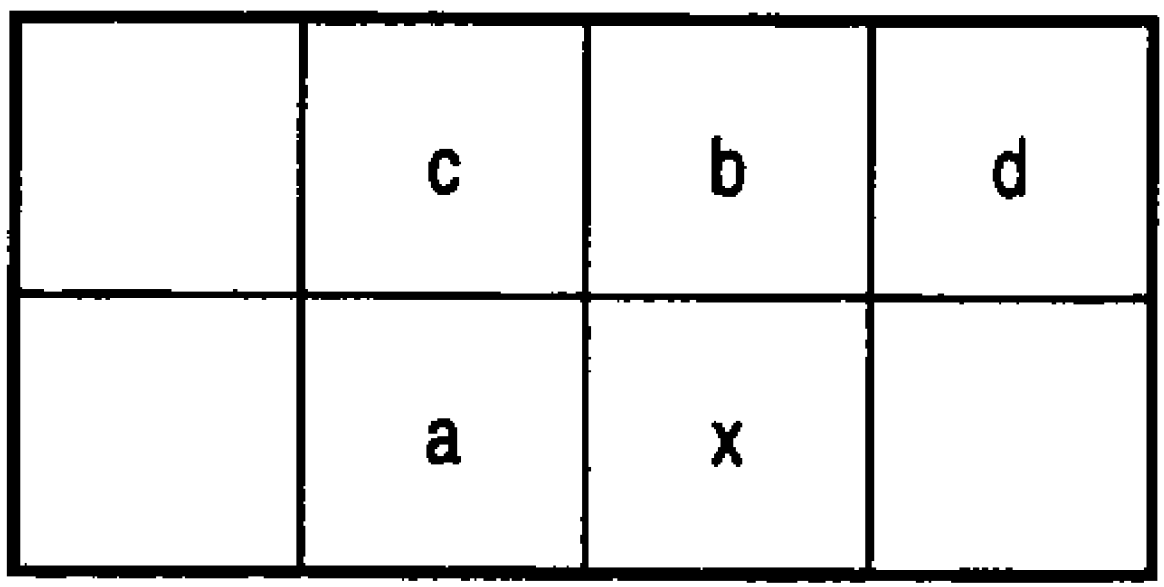
FIG. 3 is a view showing the positional relationship between a pixel X of interest and surrounding pixels "a", "b", "c", and "d" in performing predictive encoding.

For each component of a pixel X of interest (target pixel), the color count calculation unit 101a receives the values of the four surrounding pixels "a", "b", "c", and "d" in FIG. 3 from the buffer 201, obtaining pixels Xa, Xb, Xc, and Xd. Letting (x,y) be the position of the pixel of interest, Xa, Xb, Xc, and Xd are expressed as follows:

$Xa=(P(x-1,y,0),P(x-1,y,1),P(x-1,y,2))$ $Xb=(P(x,y-1,0),P(x,y-1,1),P(x,y-1,2))$ $Xc=(P(x-1,y-1,0),P(x-1,y-1,1),P(x-1,y-1,2))$ $Xd=(P(x+1,y-1,0),P(x+1,y-1,1),P(x+1,y-1,2))$

The color count calculation unit 101a detects the number of color types contained in the four pixels Xa, Xb, Xc, and Xd, and outputs a color count Nc onto the signal line 109. More specifically, the color count calculation unit 101a counts the number of extracted pairs having the same color among six pairs (Xa,Xb), (Xa,Xc), (Xa,Xd), (Xb,Xc), (Xb,Xd), and (Xc,Xd) each prepared by extracting two pixels from four pixels. The color count calculation unit 101a determines that there are four colors if the count is "0", three colors if "1", two colors if "2" or "3", and one color if "6". The color count calculation unit 101a outputs the color count Nc onto the signal line 109.

The neighborhood matching information encoding unit 102 generates neighboring pixel state information and vector information on the basis of the color count Nc input via the signal line 109, the pixel X of interest, and the neighboring pixels Xa, Xb, Xc, and Xd. The neighborhood matching information encoding unit 102 outputs the neighboring pixel state information onto the signal line 108. The neighborhood matching information encoding unit 102 internally encodes the vector information, and outputs the code word onto the signal line 110.

Figure 11:
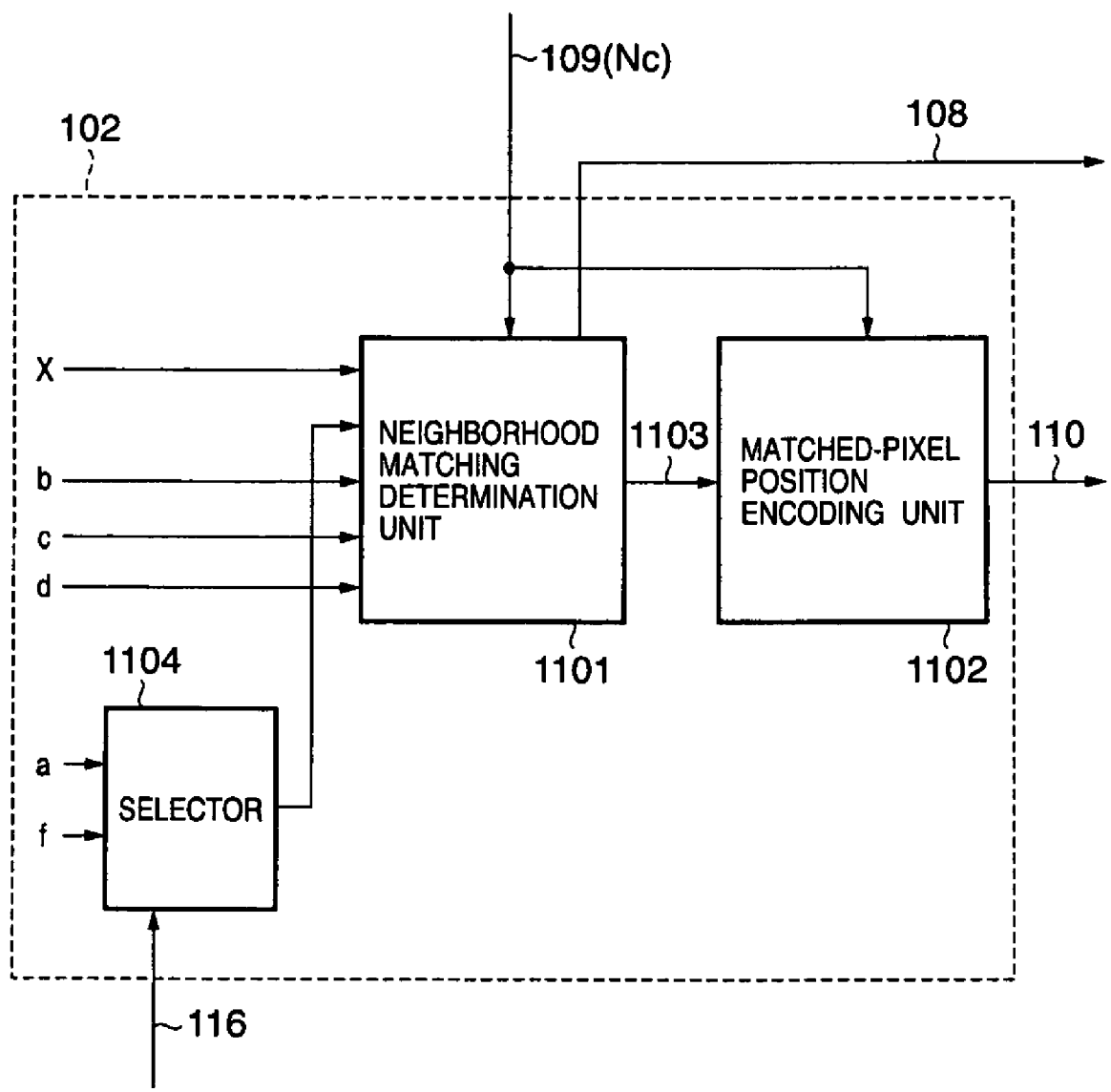
FIG. 11 is a block diagram showing a neighborhood matching information encoding unit 102 in the embodiment.

FIG. 11 is a block diagram showing in more detail the internal configuration of the neighborhood matching information encoding unit 102 in the embodiment. As shown in FIG. 11, the neighborhood matching information encoding unit 102 is configured by a neighborhood matching determination unit 1101, matched-pixel position encoding unit 1102, and selector 1104. Reference numeral 1103 denotes a signal line. The reason that the selector 1104 is arranged will be described in detail later. In this description, the selector 1104 selects data "a".

A process performed in the neighborhood matching information encoding unit 102 will be explained with reference to FIG. 11.

Vector information output from the neighborhood matching determination unit 1101 to the signal line 1103 will be explained.

The neighborhood matching determination unit 1101 generates vector information for specifying whether a pixel having the same color as that of the pixel X of interest exists in four surrounding pixels (Xa, Xb, Xc, and Xd), and when the matched pixel exists, specifying the relative position of the pixel. The neighborhood matching determination unit 1101 outputs the vector information to the signal line 1103. The vector information is determined depending on the color count Nc input via the signal line 109. Processes by the neighborhood matching determination unit 1101 will be described for respective color counts Nc.

When the color count Nc is 4, i.e., Xa, Xb, Xc, and Xd all have different pixel values, the neighborhood matching determination unit 1101 unconditionally outputs "4" as the vector information.

When the color count Nc is 1, i.e., Xa to Xd have the same color, the pixel X of interest is compared with the neighboring pixel Xa. If X=Xa, the neighborhood matching determination unit 1101 outputs "0" as the vector information; if X≠Xa, "1".

When the color count Nc is 2, i.e., two pairs each having the same color exist in Xa to Xd, the first pixel value (color) X1 and second pixel value X2 different from X1 are obtained in the order of Xa, Xb, Xc, and Xd. If X=X1, the neighborhood matching determination unit 1101 outputs "0" as the vector information; if X=X2, "1"; and if X≠X1 and X≠X2, "2". In the order of Xa, Xb, Xc, and Xd, the first pixel X1 is Xa. The second pixel X2 is one of Xb, Xc, and Xd that has a value different from that of Xa.

When the color count Nc is 3, i.e., one pair having the same color exists in Xa to Xd, the first pixel value X1, second pixel value X2, and third pixel value X3 are obtained in the order of Xa, Xb, Xc, and Xd. If X=X1, the neighborhood matching determination unit 1101 outputs "0" as the vector information; if X=X2, "1"; if X=X3, "2"; and if X≠X1, X≠X2, and X≠X3, "3". In the order of Xa, Xb, Xc, and Xd, the pixel X1 is Xa. The second pixel X2 is a pixel which does not match Xa for the first time in the order of Xb, Xc, and Xd. The pixel value X3 is a pixel which follows X2 and does not match X2.

Neighboring pixel state information to be output from the neighborhood matching determination unit 1101 to the signal line 108 will be explained.

The neighboring pixel state information represents whether a pixel having the same color as that of the pixel X of interest exists in four neighboring pixels. More specifically, the neighborhood matching determination unit 1101 compares vector information output to the signal line 1103 with the color count Nc input via the signal line 109. If the vector information coincides with the color count Nc, the neighborhood matching determination unit 1101 outputs "0" as the neighboring pixel state information to the signal line 108; otherwise, "1". For the color count Nc=4, the neighborhood matching determination unit 1101 always outputs "1". For the color count Nc≠4 (=3 or less), if the pixel X of interest does not match any of the four surrounding pixels Xa, Xb, Xc, and Xd, the neighborhood matching determination unit 1101 outputs "1"; if the pixel X of interest matches at least one of them, "0".

FIG. 12 shows the relationship between the vector information and the neighboring pixel state information. As is apparent from FIG. 12, the neighboring pixel state information is "0" when the color count Nc in four pixels near the pixel X of interest is three or less, and the four neighboring pixels contain at least one pixel having the same color as that of the pixel X of interest. In other words, the neighboring pixel state information is "0" when at least one pair having the same color exists in N (N=4 in the first embodiment) pixels near the pixel X of interest, and the pixel X of interest has the same color as that of any of the neighboring pixels.

Referring back to FIG. 11, the matched-pixel position encoding unit 1102 encodes the vector information input from the signal line 1103, and outputs a resultant code word to the signal line 110. In the first embodiment, the matched-pixel position encoding unit 1102 switches between the code tables in FIGS. 15A to 15C and uses the selected one in accordance with the color count Nc. When the color count Nc is 4, the matched-pixel position encoding unit 1102 does not output any code. Even if the matched-pixel position encoding unit 1102 outputs any code, the code is not employed as the code word of final image data, which will be described later.

By the above-described operation, the code word of the vector information is output onto the signal line 110, and the neighboring pixel state information is output onto the signal line 108.

Referring back to FIG. 1, the code generation unit 105 generates a code word to be output on the basis of the neighboring pixel state information (signal on the signal line 108) and the code word (signal on the signal line 110) of the vector information from the neighborhood matching information encoding unit 102, and a code word from the predictive component value encoding unit 103. The code generation unit 105 outputs the code word to the switch 106. The neighborhood matching information encoding unit 102 has already been described above, and the predictive component value encoding unit 103 will be explained.

Predictive encoding of a component value can utilize a JPEG lossless encoding mode, or a scheme described as a regular mode in JPEG-LS (ITU-T T.87 ISO/IEC 14495-1) serving as an international standard for lossless encoding and near lossless encoding. For descriptive convenience, a simple configuration will be explained.

Figure 2:
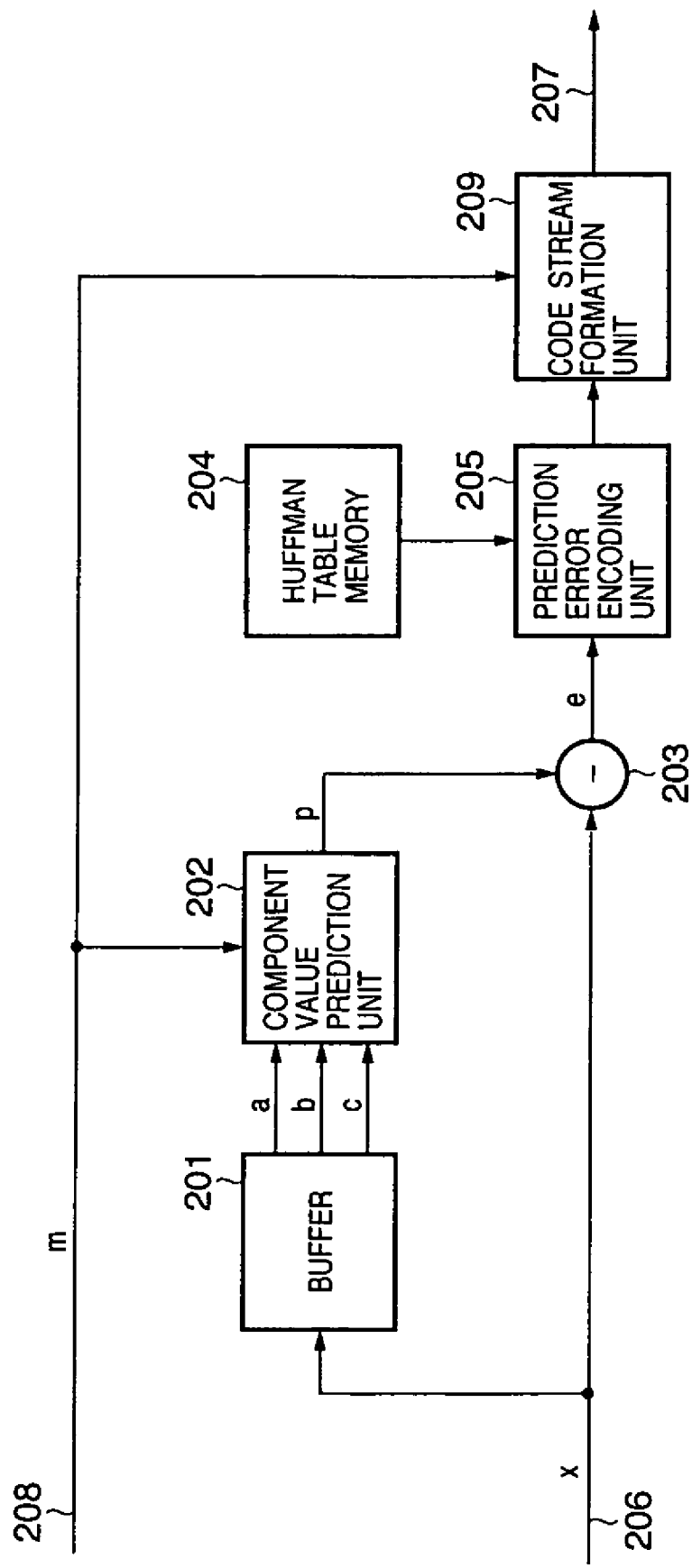
FIG. 2 is a block diagram showing a predictive encoding apparatus.
Figure 10:
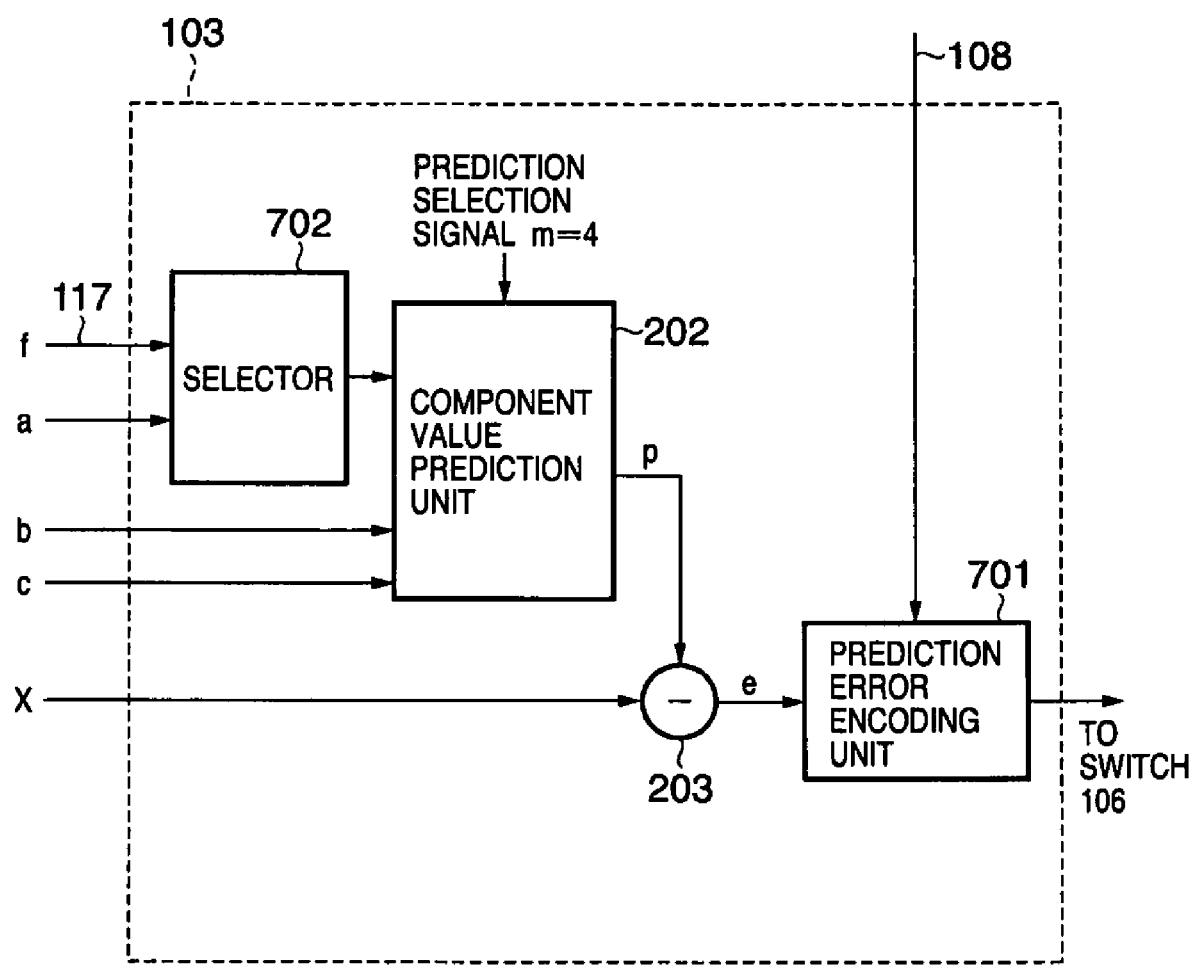
FIG. 10 is a block diagram showing a predictive component value encoding unit 103 in the embodiment.

FIG. 10 is a block diagram showing subblocks in the internal configuration of the predictive component value encoding unit 103. As shown in FIG. 10, the predictive component value encoding unit 103 is made up of a component value prediction unit 202, subtracter 203, prediction error encoding unit 701, and selector 702. Reference numeral 108 denotes a signal line for inputting the above-described neighboring pixel state information. The reason that the selector 702 is arranged will be described later. In this description, the selector 702 selects data "a". The same reference numerals denote blocks which perform the same functions as those of processing blocks described in BACKGROUND OF THE INVENTION with reference to FIG. 2, and a description thereof will be omitted.

By the same operation as the conventional scheme described above, the component value prediction unit 202 generates a predicted value p from values "a", "b", and "c" of pixels for each component around the pixel X of interest. The subtracter 203 generates a difference (prediction error) e=x−p from the component value x (x is one of R, G, and B) of the pixel of interest, and inputs the prediction error e to the prediction error encoding unit 701. In the first embodiment, a prediction selection signal m input to the component value prediction unit 202 is set to a fixed value "4", and all component values are predicted by an equation "a+b−c". The prediction error encoding unit 701 encodes the prediction error e by using Golomb encoding.

Golomb encoding encodes a nonnegative integral value, and as its feature, can achieve encoding based on different probability models in accordance with a parameter variable k. Golomb encoding can derive a code word from a symbol to be encoded and the parameter variable k, and does not require any code table. One form of Golomb encoding is employed as a prediction error encoding scheme in JPEG-LS (ISO/IEC 14495-1|ITU-T Recommendation T.87) recommended as an international standard by ISO and ITU-T. In the first embodiment, the prediction error e output from the subtracter 203 is converted into a nonnegative integral value (defined as V) in accordance with the following equation, and V is Golomb-encoded by the selected parameter k:

For e≧0, $V = 2 \times e$

For e<0, $V = -2 \times e - 1$

The procedures of Golomb-encoding the nonnegative integral value V at the encoding parameter k are as follows.

V is shifted to the right by k bits to obtain an integral value m. The code of V is formed from a combination of "1" (variable length part) following m "0"s and the lower k bits (fixed-length part) of V. FIG. 16 shows an example of Golomb codes at k=0, 1, 2, 3. The above-described code formation method is merely an example, and a uniquely decodable code can be formed even by replacing the fixed-length part and variable length part. The code can also be formed by replacing 0 and 1. As the method of selecting the encoding parameter k, various methods are conceivable, including a method of selecting an optimal parameter k in a predetermined unit and integrating the parameter k into a code stream. The first embodiment adopts a method of updating the parameter k during encoding by the same method as JPEG-LS. The method of selecting the encoding parameter k will be described.

The prediction error encoding unit 1001 comprises a counter N which holds the number of encoded pixels, and counters A[C] (C is a component number of 0 to 2) each of which holds the sum of the absolute values of encoded prediction errors for each component. At the start of encoding, the counter N is set to 1, and the counters A[0] to A[2] are set to 2. A maximum value k at which N×2 k does not exceed A[C] is obtained for each component value to be encoded. The prediction error e is Golomb-encoded by the above-described procedure using k, outputting a code word (note that xy means y powers of x).

After the encoding process of each component, k is updated by adding the absolute value |e| of the prediction error to A[C]. In this case, N is incremented by one and updated after the encoding process of all components. In order to limit A[C] and N within a predetermined range, a process of updating A[C] and N to ½ at the timing when N reaches a predetermined value (e.g., 32) is applied. The prediction error encoding unit 1001 operates only when neighboring pixel state information input via the signal line 108 is "1".

The process contents of the predictive component value encoding unit 103 according to the first embodiment have been described. The code generation unit 105 will be explained.

In the first embodiment, as shown in FIG. 1, the code generation unit 105 receives four pieces of information: the predicted code words of R, G, and B components output from the predictive component value encoding unit 103, the code word of vector information and neighboring pixel state information which are output from the neighborhood matching information encoding unit 102, and the color count Nc. On the basis of these four pieces of information, the code generation unit 105 executes one of processes A to C.

[Process A]

When neighboring pixel state information is "0", i.e., the number of colors contained in four pixels near the pixel X of interest is three or less, as shown in FIG. 12, and a pixel having the same color as that of the pixel X of interest exists in the four neighboring pixels, the code generation unit 105 outputs only the code word of input vector information.

[Process B]

If the color count Nc<4 and neighboring pixel state information is "1", i.e., the number of colors contained in four pixels near the pixel X of interest is three or less, as shown in FIG. 12, and no pixel having the same color as that of the pixel X of interest exists in the four neighboring pixels, the code generation unit 105 outputs the predicted code words of R, G, and B components output from the predictive component value encoding unit 103, following the code word of input vector information.

[Process C]

If the color count NC=4, the code generation unit 105 outputs only the predicted code words of R, G, and B components output from the predictive component value encoding unit 103, and does not output the code word of vector information.

FIGS. 8A to 8C show code data output from the code generation unit 105. FIG. 8A shows the result of process A, FIG. 8B shows that of process B, and FIG. 8C shows that of process C.

Referring back to FIG. 1, the run-length encoding unit 104 in the embodiment will be explained.

The run-length encoding unit 104 holds a counter RL which counts the run of the same pixel value. The counter RL starts counting when the color count Nc of a pixel immediately before the pixel X of interest is a value other than "1" and the color count Nc of the pixel X of interest becomes "1". Once counting starts the number of pixels is kept counted regardless of the color count Nc until the pixel X of interest has a color different from the immediately preceding pixel value Xa or the process of the final pixel on one line ends. When the run ends (no run may be counted), the value held by the counter RL is run-length-encoded and output to the switch 106. Note that the run-length encoding unit 104 outputs, to the switch 106 via a signal line 115, status information representing whether the counter RL is counting the run or does not count it. When the run ends, the run-length encoding unit 104 outputs information on this effect to a signal line 116 whose meaning will be described later.

The run length can be encoded by various methods. The first embodiment employs the same method as run-length encoding using a run mode in the international standard JPEG-LS, and details thereof will be omitted.

The switch 106 in FIG. 1 will be described.

Prior to a description, $X_i$ is defined as a pixel of interest; $Nc_i$, as the color count of four pixels near the pixel $X_i$ of interest; $X_{i-1}$, as a pixel immediately before the pixel $X_i$ of interest; and $Nc_{i-1}$, as the color count of four pixels near the pixel $X_{i-1}$. Encoded data (encoded data in FIG. 8A or 8B) output from the code generation unit 105 is called pixel-encoded data, and encoded data output from the run-length encoding unit 104 is called run length-encoded data, discriminating these encoded data. Status information output from the run-length encoding unit 104 onto the signal line 115 is "1" while the run is measured, and "0" when no run is measured.

When Status Information is "0":

The switch 106 selects a terminal "a", selects encoded data of the pixel $X_i$ of interest, and outputs it to the code stream formation unit 107. At this time, if $Nc_{i-1} \neq 1$ and $Nc_i=1$, the switch 106 is switched to a terminal b after outputting pixel-encoded data to the code stream formation unit 107. The reason that the switch 106 is switched to the terminal b is that the run-length encoding unit 104 starts measuring the run under the above-described condition and no pixel-encoded data is output while the run is measured. Under a condition other than the above one, the switch 106 keeps selecting the terminal "a".

When Status Information is "1":

The switch 106 selects the terminal b. At this time, while the run-length encoding unit 104 measures the run, it does not output any run length-encoded data, and the switch 106 does not output any data to the code stream formation unit 107. When the run-length encoding unit 104 detects the end of the run, it outputs run length-encoded data. Hence, the switch 106 outputs the run length-encoded data to the code stream formation unit 107. After outputting the run length-encoded data, the run-length encoding unit 104 changes its status information to "0". The status changes from "1" to "0" after measurement of the run ends. Measurement of the run ends when the relationship between the pixel X of interest and the immediately preceding pixel Xa is X≠Xa, or if X=Xa, the pixel X of interest is positioned at the end of the line. In the former case, the switch 106 selects the terminal "a" immediately after outputting the run length-encoded data, in order to output pixel-encoded data of the pixel of interest.

As described above, prior to image encoding, the code stream formation unit outputs, as a header, additional information (e.g., the prediction selection signal m, the numbers of horizontal and vertical pixels of an image, the number of components which form a pixel, and the precision of each component). Following the header, the code stream formation unit sequentially outputs encoded data input via the switch 106. When the output destination is a storage device, the encoded data are output as a file.

Figure 9:
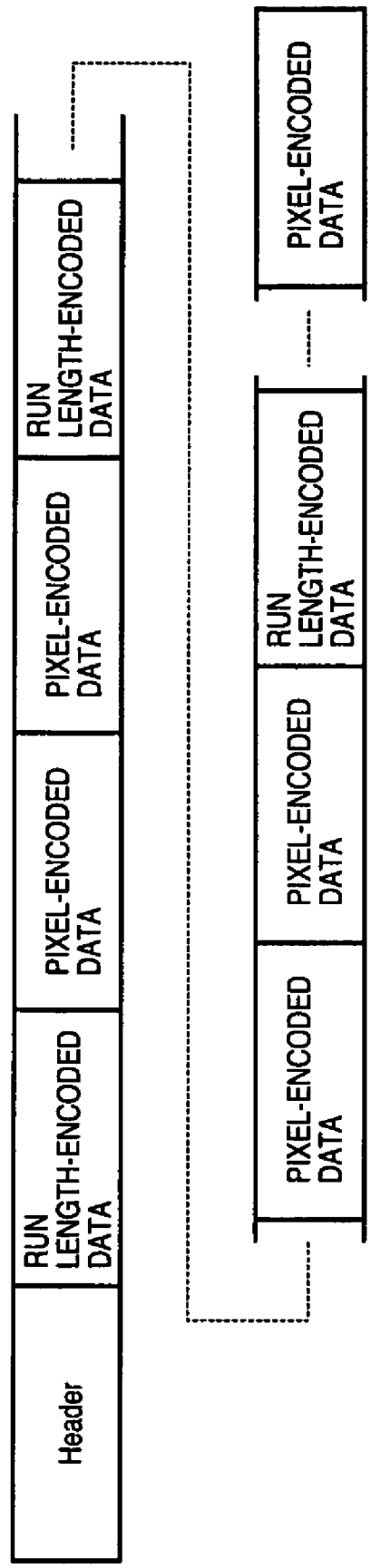
FIG. 9 is a view showing the data structure of the output code stream of encoded data in the embodiment.

FIG. 9 shows the structure of encoded data output from the code stream formation unit 107. In FIG. 9, the order of run length-encoded data and pixel-encoded data is arbitrary. FIG. 9 shows that run length-encoded data and pixel-encoded data can coexist without any special break such as a marker. In the image processing apparatus according to the first embodiment, the prediction selection signal m is set to a fixed value, and may also be excluded from the header.

In FIG. 9, encoded data immediately after the header is run length-encoded data because of the following reason. According to the above description, when the pixel of interest is positioned at the upper left corner of image data to be encoded, "a", "b", and "c" used to obtain a predicted value fall outside the image area, and are treated as a=b=c=0. More specifically, since a=b=c, the color count Nc of pixels around the pixel X of interest is "1", and run length-encoded data of at least 0 or more is output.

In the first embodiment, the matched-pixel position encoding unit 1102 in the neighborhood matching information encoding unit 102 performs encoding using one of the encoding tables in FIGS. 15A to 15C on the basis of the color count Nc. Alternatively, the matched-pixel position encoding unit 1102 may generate the code word of vector information using one table shown in FIG. 7 regardless of the color count Nc. When the color count Nc=1, the code word suffices to be formed from 1 bit regardless of whether the vector information is 0 or 1. To the contrary in FIG. 7, a code word of 2 bits or more is generated, and the vector information encoding table is desirably switched in accordance with the color count Nc, as shown in FIGS. 15A to 15C.

The reason that the signal 116 in FIG. 1, the selector 702 in FIG. 10, the selector 1104 in FIG. 11, and the selector 101b, register 101c, and latch 101d in FIG. 24 are arranged, and their operations will be explained.

As is understood from the above description, the run by the run-length encoding unit 104 ends when the color of the pixel X of interest and that of the immediately preceding pixel Xa are different from each other. At this time, a value stored in the counter RL is run-length-encoded, the code word is output to the switch 106, and then pixel-encoded data of the pixel X of interest is output. As for the pixel X of interest, X≠Xa, and vector information does not take "0", as is easily understood from FIG. 12.

Obviously, the encoding efficiency becomes highest when data is formed from only the code word of vector information, as shown in FIG. 8A. It will be understood that when the pixel X of interest which is determined to be the end of the run is compared with a pixel Xf different from Xa (also X1), a higher compression ratio can be expected because of the possibility of X=Xf. The pixel Xf is desirably positioned near the pixel X of interest. As the pixel Xf, the first embodiment adopts a pixel which is determined to be the end of the run in previous run-length encoding. In other words, the pixel X of interest which is determined to be the end of the run in the current run-length encoding is stored and held as the neighboring pixel Xf used when the run is determined to end in the next run-length encoding.

Figure 18:
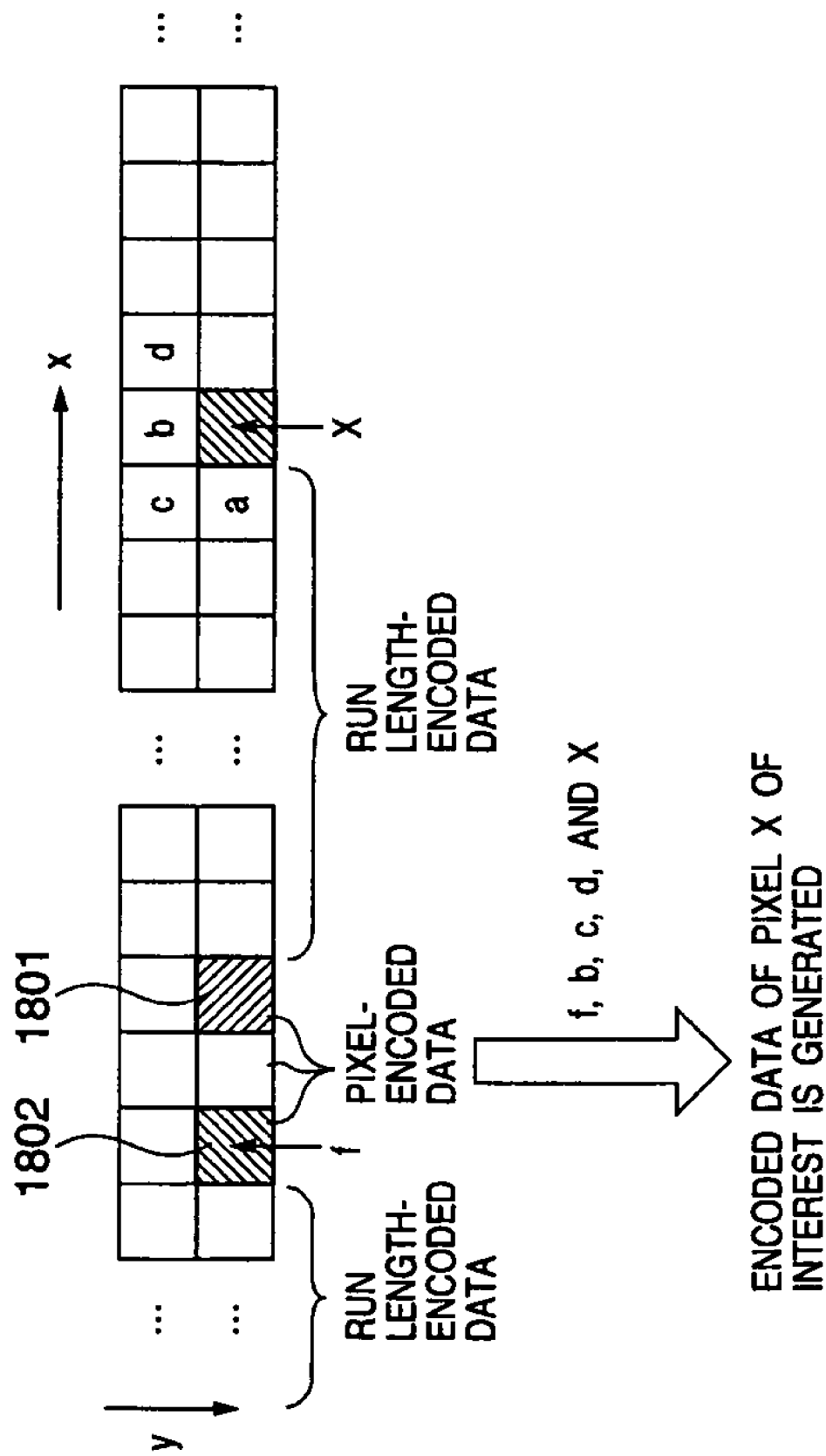
FIG. 18 is a view showing the positions of reference pixels "f", "b", "c", and "d" when the pixel X of interest ends the run in the first embodiment.

FIG. 18 shows an example of an input image when the pixel X of interest ends run length-encoded data. Run length-encoded data immediately before the pixel X of interest shows a case wherein pixels having the same color as that of a pixel 1801 serving as the origin of the run continue and the color changes at the pixel X of interest. At a pixel 1802, the end of the previous run is detected. In this situation, to generate pixel-encoded data of the pixel of interest, the color count determination unit 101 calculates again the color count Nc on the basis of the pixels "b", "c", and "d" near the pixel of interest, and pixel data "f" of the pixel 1802 instead of the pixel data "a". The neighborhood matching information encoding unit 102 encodes vector information, and generates neighboring pixel state information again. The predictive component value encoding unit 103 obtains the predicted value p on the basis of the pixel data "f", "b", and "c", and performs a prediction error encoding process for the pixel X of interest.

In order to implement the above process, when the end of the run is detected, the run-length encoding unit 104 outputs run end detection information onto the signal line 116 in order to hold data (R, G, and B component data) of the pixel X of interest at that time in the color count determination unit 101.

As shown in FIG. 24, upon reception of the run end detection information via the signal line 116, a latch 101d in the color count determination unit 101 latches data of a register 101c, and outputs it as the pixel data "f" to a selector 101b, the neighborhood matching information encoding unit 102, and the predictive component value encoding unit 103. After storage and latching by the latch 101d, the register 101c overwrites (updates) previously stored/held data with data of the pixel X of interest at that time. That is, the register 101c holds the data of the pixel X of interest, and the latch 101d latches the pixel data f at which the run of the previous run-length code word ends. Note that when an image data encoding process starts and run-length encoding is performed for the first time, no data f exists. Thus, prior to encoding one image data, proper values, e.g., "0"s are set as R, G, and B components in the register 101c. These values are not limited to "0" as far as the values are equal to those on the decoding side.

Upon reception of the run end detection information via the signal line 116, the selector 101b outputs data "f" instead of data "a" to the color count calculation unit 101a. The color count calculation unit calculates the color count Nc again on the basis of the pixels "b", "c", and "d" near the pixel X of interest and the pixel "f".

When the neighborhood matching information encoding unit 102 receives the run end detection information via the signal line 116, it causes the selector 1104 to select the pixel data f. The neighborhood matching information encoding unit 102 generates vector information again, encodes it again, outputs the encoded vector information to the signal line 110, and outputs again neighboring pixel state information to the signal line 108.

Also, when the predictive component value encoding unit 103 receives the run end detection information via the signal line 116, it causes the selector 702 to select the pixel data "f". The predictive component value encoding unit 103 calculates the predicted code word of the pixel of interest on the basis of the prediction selection signal and the component values of the data "f", "b", and "c".

As described above, when the status signal output from the run-length encoding unit 104 onto the signal line 115 changes from "1" to "0", the switch 106 outputs run length-encoded data input from the run-length encoding unit 104. The switch 106 outputs the run length-encoded data to the code stream formation unit 107, and then outputs pixel-encoded data corresponding to the pixel X of interest that is generated by the color count determination unit 101, neighborhood matching information encoding unit 102, and predictive component value encoding unit 103 on the basis of the data "f" in place of the data "a".

As described above, according to the first embodiment, the image processing apparatus comprises the neighborhood matching information encoding unit 102, predictive component value encoding unit 103, and run-length encoding unit 104. The image processing apparatus executes encoding by switching the type of encoding method for these units in accordance with the number of colors present in the encoded pixels Xa, Xb, Xc, and Xd around the pixel X of interest to be encoded. In particular, switching between pixel-encoded data and run length-encoded data is determined in accordance with information on encoded pixel positions. Thus, encoded data does not require any special identification information representing that the type of encoding method is switched.

According to the first embodiment, when the run-length encoding unit 104 determines that the pixel X of interest ends the run, the color count determination unit 101, neighborhood matching information encoding unit 102, and predictive component value encoding unit perform recalculation by temporarily referring to the pixel Xf at another position instead of the pixel data Xa which should be referred to in normal predictive encoding. A decrease in probability at which the format in FIG. 8A is adopted as the output format of pixel-encoded data can be suppressed, and higher compression efficiency can be expected.

Figure 13:
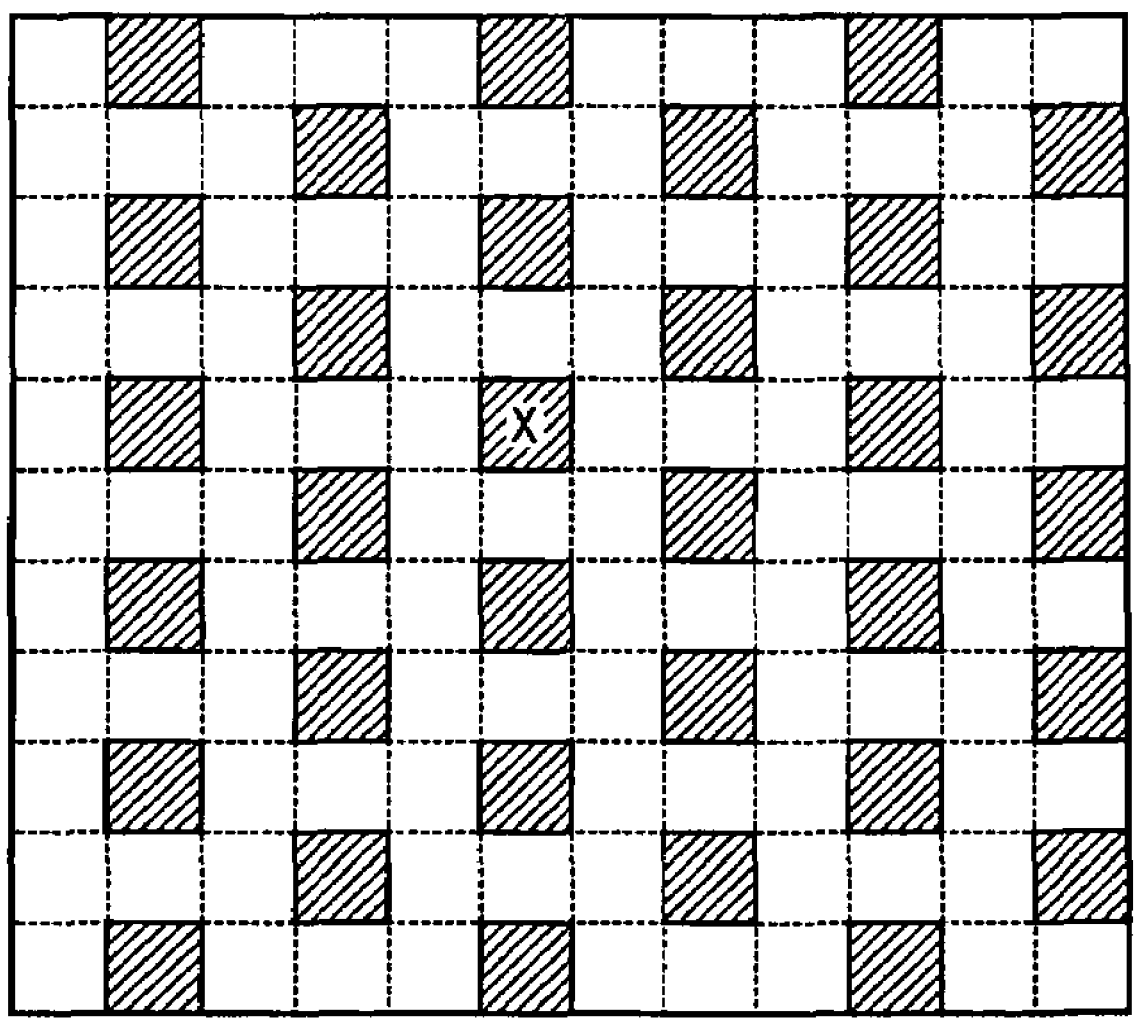
FIG. 13 is a view showing an example of an image in which an effect is produced by encoding in the first embodiment.

For example, in encoding the pixel X of interest in image data which has a predetermined periodicity and is formed from an image in which a given pixel value is arranged every four pixels, as shown in FIG. 13, the process enters the run-length encoding mode because four surrounding pixels "a", "b", "c", and "d" have the same pixel value. However, the run ends at a length of 0, and the process shifts to encoding of vector information. When the four surrounding pixels are referred to, no matched pixel is detected, and the vector information is predictively encoded, decreasing the encoding efficiency. To the contrary, the vector information is encoded by referring to the pixel Xf serving as the end of the immediately preceding run, and the possibility at which the pixel Xf matches the pixel X of interest rises, increasing the encoding efficiency.

<Description of Modification>

The first embodiment has been described on the basis of the configuration in FIG. 1, but the same process as that of the first embodiment may also be implemented by a computer program.

Figure 14:
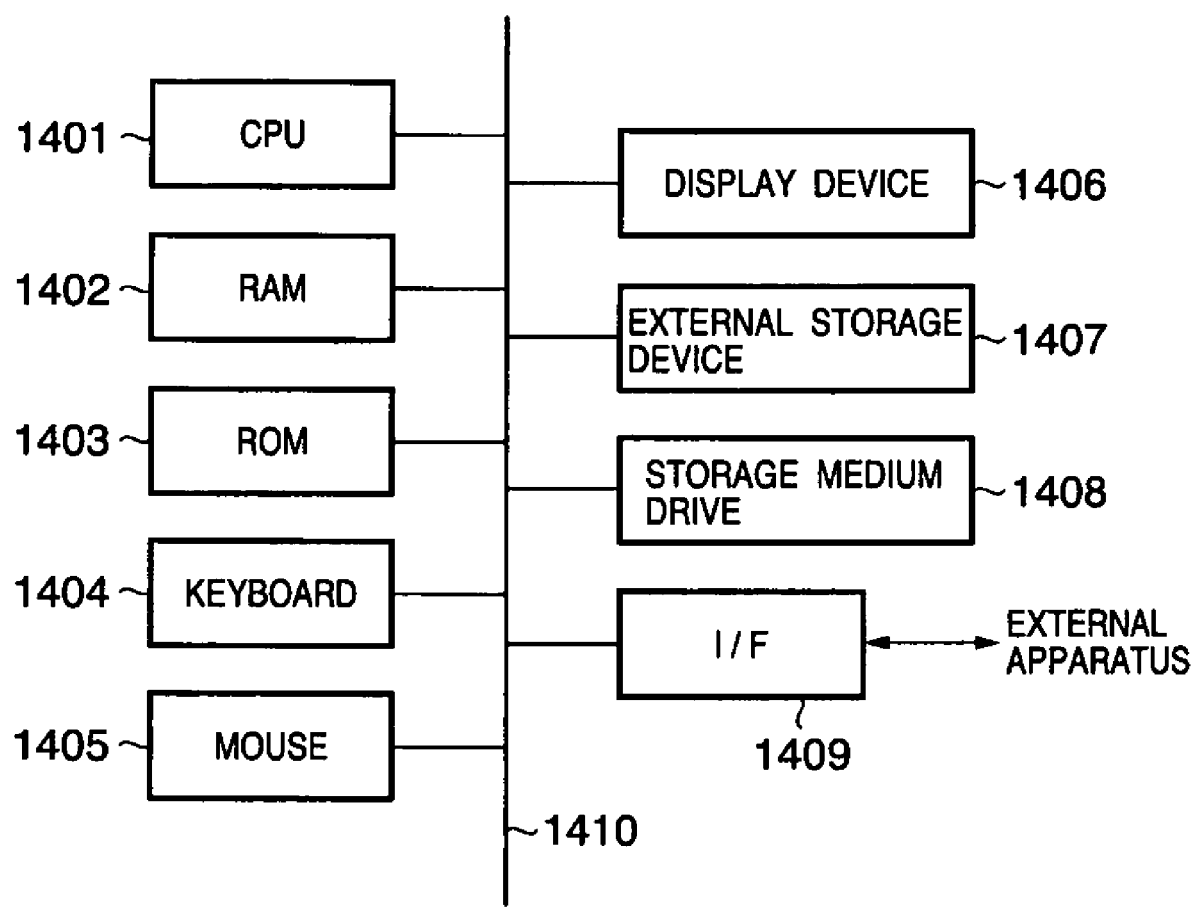
FIG. 14 is a block diagram showing a computer when the process in the embodiment is implemented by a computer program.

FIG. 14 is a block diagram showing the basic configuration of an apparatus (PC or the like) when the apparatus is implemented by software.

In FIG. 14, reference numeral 1401 denotes a CPU which controls the overall apparatus by using programs and data stored in a RAM 1402 and ROM 1403, and in addition, executes image encoding and decoding processes to be described later.

The RAM 1402 is used to store programs and data which are downloaded from an external storage device 1407, a storage medium drive 1408, or an external apparatus via an I/F 1409. The RAM 1402 is also used as a work area when the CPU 1401 executes various processes. The buffer 201, Huffman table memory 204, and the like shown in FIG. 1 are also allocated in the RAM 1402.

The ROM 1403 stores a boot program, apparatus setting programs, and data.

Reference numerals 1404 and 1405 denote a keyboard and a pointing device (e.g., mouse), respectively, which allow the user to input various instructions to the CPU 1401.

Reference numeral 1406 denotes a display device which is made up of a CRT, liquid crystal screen, and the like, and can display information such as an image and text.

The external storage device 1407 is a large-capacity information storage device such as a hard disk drive. The external storage device 1407 saves an OS, programs for image encoding and decoding processes to be described later, image data to be encoded, encoded data of an image to be decoded, and the like. Programs and data are loaded into a predetermined area in the RAM 1402 under the control of the CPU 1401.

The storage medium drive 1408 reads out programs and data which are recorded on a storage medium such as a CD-ROM or DVD-ROM, and outputs the readout programs and data to the RAM 1402 and external storage device 1407. Note that the storage medium may record programs for image encoding and decoding processes to be described later, image data to be encoded, encoded data of an image to be decoded, and the like. In this case, the storage medium drive 1408 loads these programs and data to a predetermined area in the RAM 1402 under the control of the CPU 1401.

The I/F 1409 connects an external apparatus to the image processing apparatus, and allows data communication between the image processing apparatus and the external apparatus. For example, the I/F 1409 allows inputting image data to be encoded, encoded data of an image to be decoded, and the like to the RAM 1402, external storage device 1407, or storage medium drive 1408 of the apparatus. Reference numeral 1410 denotes a bus which connects the above units.

In the above configuration, when the same process as that of the first process is implemented by software, processes corresponding to various building components typified by the color count determination unit 101 shown in FIG. 1 are implemented by functions, subroutines, and the like in software. Also in this modification, the names of the processing units in FIG. 1 are directly used for descriptive convenience. Note that the buffer 201 is allocated in the RAM 1402 by the CPU 1401 prior to the start of a process.

Figure 17:
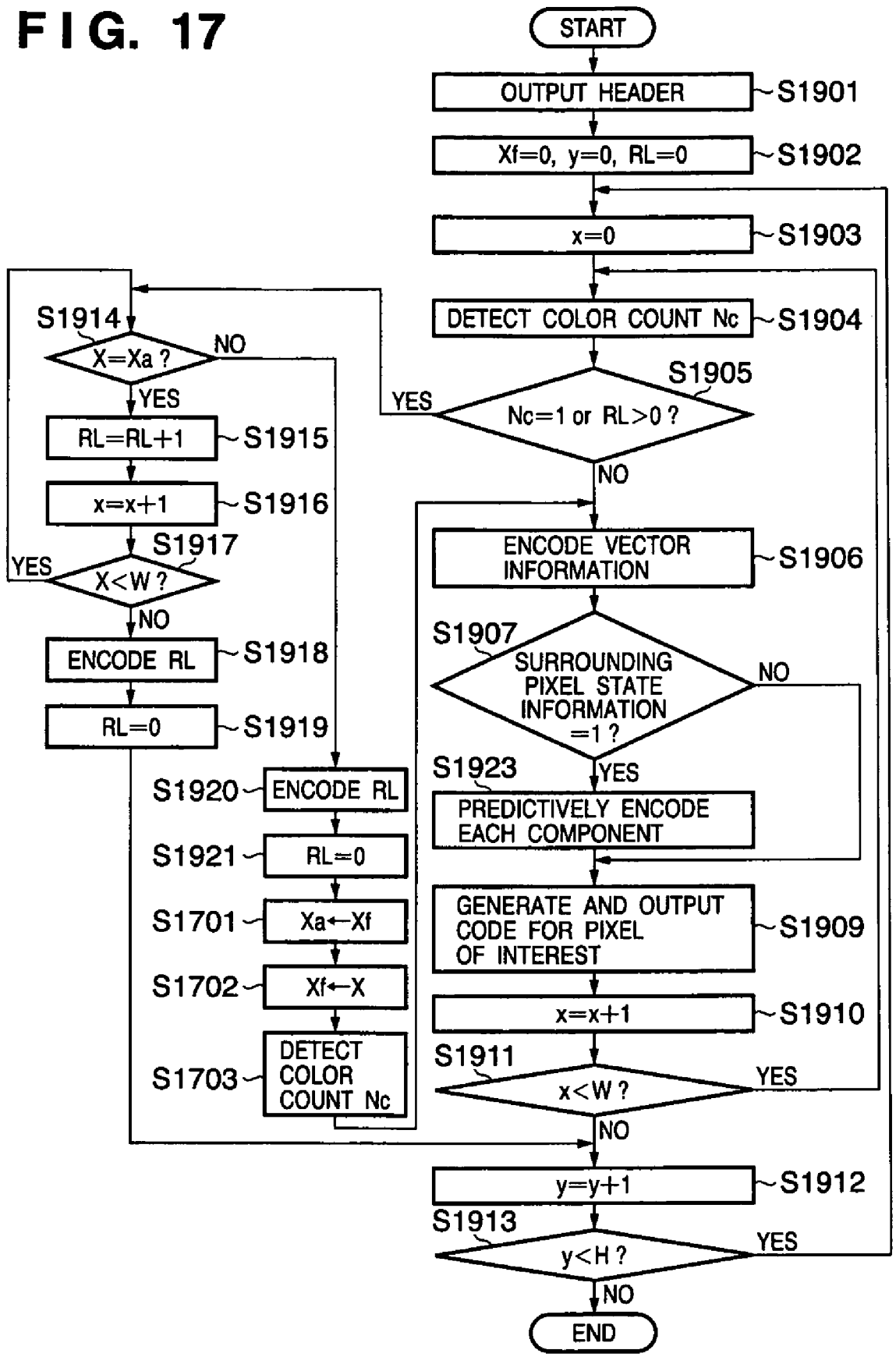
FIG. 17 is a flowchart showing encoding process procedures when the process in the first embodiment is implemented by a computer program.

FIG. 17 is a flowchart showing the flow of an encoding process by the image processing apparatus according to the modification. Note that a program complying with FIG. 17 is loaded into the RAM 1402 and executed by the CPU 1401 to achieve a process complying with the flowchart shown in FIG. 17. The overall flow of the application program according to the modification will be explained with reference to FIG. 17.

The code stream formation unit 107 generates and outputs a header containing additional information of an image to be encoded (step S1901). A counter y which holds the vertical position of the pixel of interest is set to 0, the counter RL held in the run-length encoding unit 104 is initialized to 0, and the component values of the reference pixel Xf upon detection of the end of the run are initialized to "0" (step S1902). Further, a counter x which holds the horizontal position of the pixel of interest is set to 0 (step S1903). The color count determination unit 101 obtains the color count Nc of pixels "a", "b", "c", and "d" around the pixel X of interest at coordinates (x,y) (step S1904). When the pixel of interest is positioned on the first line of the image to be encoded, none of "b", "c", and "d" (see FIG. 3) exists, and the R, G, and B component values of these surrounding pixels are set to 0. When x=0, neither the surrounding pixel "a" nor "c" exists, and their R, G, and B component values are set to 0. However, the R, G, and B component values are not limited to these values as far as the values become equal to those in the decoding process.

In step S1905, it is determined whether the color count Nc is 1 or the counter RL holds a value other than 0. If the color count Nc=1 or the counter RL holds a value other than 0 (YES in step S1905), the process shifts to step S1914. If the above conditions are not met (NO in step S1905), the process shifts to step S1906 (step S1905).

After the process shifts to step S1906, the neighborhood matching information encoding unit 102 encodes vector information for the pixel of interest, and outputs the code word via the code generation unit 105. The process advances to step S1907 to determine whether neighboring pixel state information at the position of the pixel of interest is "1" (step S1907). If the neighboring pixel state information is "1" (YES in step S1907), the process advances to step S1923, and the predictive component value encoding unit 103 predictively encodes R, G, and B components.

In step S1909, the code word output from the code generation unit 105 and predictive component value encoding unit 103 is converted into a predetermined format by the code stream formation unit 107, forming a code stream for the pixel of interest (step S1909). Then, the counter x which holds the horizontal position of the pixel of interest is incremented by one (step S1910). The counter x is compared with the horizontal pixel count W of the image. If x<W (YES in step S1911), the process returns to step S1904 to perform the encoding process for the next pixel. If x≧W (NO in step S1911), the process shifts to step S1912 (step S1911).

If it is determined in step S1905 that the color count Nc=1 or the counter RL holds a value other than 0, the process shifts to step S1914 to compare the pixel X of interest (pixel value m represented by the counters x and y) with the immediately preceding pixel value Xa.

If X≠Xa (NO in step S1914), the process advances to step S1920.

If X=Xa (YES in step S1914), the counter RL held in the run-length encoding unit 104 is incremented by one (step S1915). Subsequently, the counter x which holds the horizontal position of the pixel of interest is incremented by one (step S1916). In step S1917, the counter x is compared with the horizontal pixel count W of the image. If x<W, the process returns to step S1914 to continue counting the next run. If x≧W, the run reaches the right end of the image. At this time, the run length is finalized, and the run-length encoding unit 104 encodes the run length held by the counter RL, and outputs a code. The code output from the run-length encoding unit 104 is sent via the switch 106 to the code stream formation unit 107, which forms a code stream of a predetermined format (step S1918). After the end of run-length encoding, the counter RL is reset to 0 (step S1919). The connection of the switch 106 is changed to the terminal "a". The process shifts to step S1912, and the target of the encoding process shifts to the next line.

If the process advances from step S1914 to step S1920, this means that the run is terminated by the appearance of a pixel value X different from the immediately preceding pixel value Xa. Therefore, the run-length encoding unit 104 encodes the run length held by the counter RL, and outputs a code. The code word output from the run-length encoding unit 104 is sent via the switch 106 to the code stream formation unit 107, which forms a code stream of a predetermined format. After the end of run-length encoding, the counter RL is reset to 0 (step S1921). At this time, data of the immediately preceding pixel Xa is replaced with the value of Xf (step S1701). In step S1702, data of Xf is updated by data of the pixel X of interest. In step S1703, the number of colors is calculated again on the basis of the pixels "f", "b", "c", and "d", and the process advances to step S1906. It should be noted that the pixel data Xa is replaced with the pixel data Xf and the process is based on the pixels "f", "b", "c", and "d" after step S1906. As a result, pixel-encoded data of the pixel of interest is generated, and the connection of the switch 106 is changed to the terminal "a".

In step S1912, the counter y which holds the vertical position of the pixel of interest is incremented by one. The counter y is compared with the vertical pixel count H of the image. If y<H (YES in step S1913), the process returns to step S1903 to similarly process a pixel on the next line. If y≧H (NO in step S1913), the encoding process for the target image ends (step S1913).

As described above, even the modification can achieve the same operation effects as those of the first embodiment.

Figure 25:
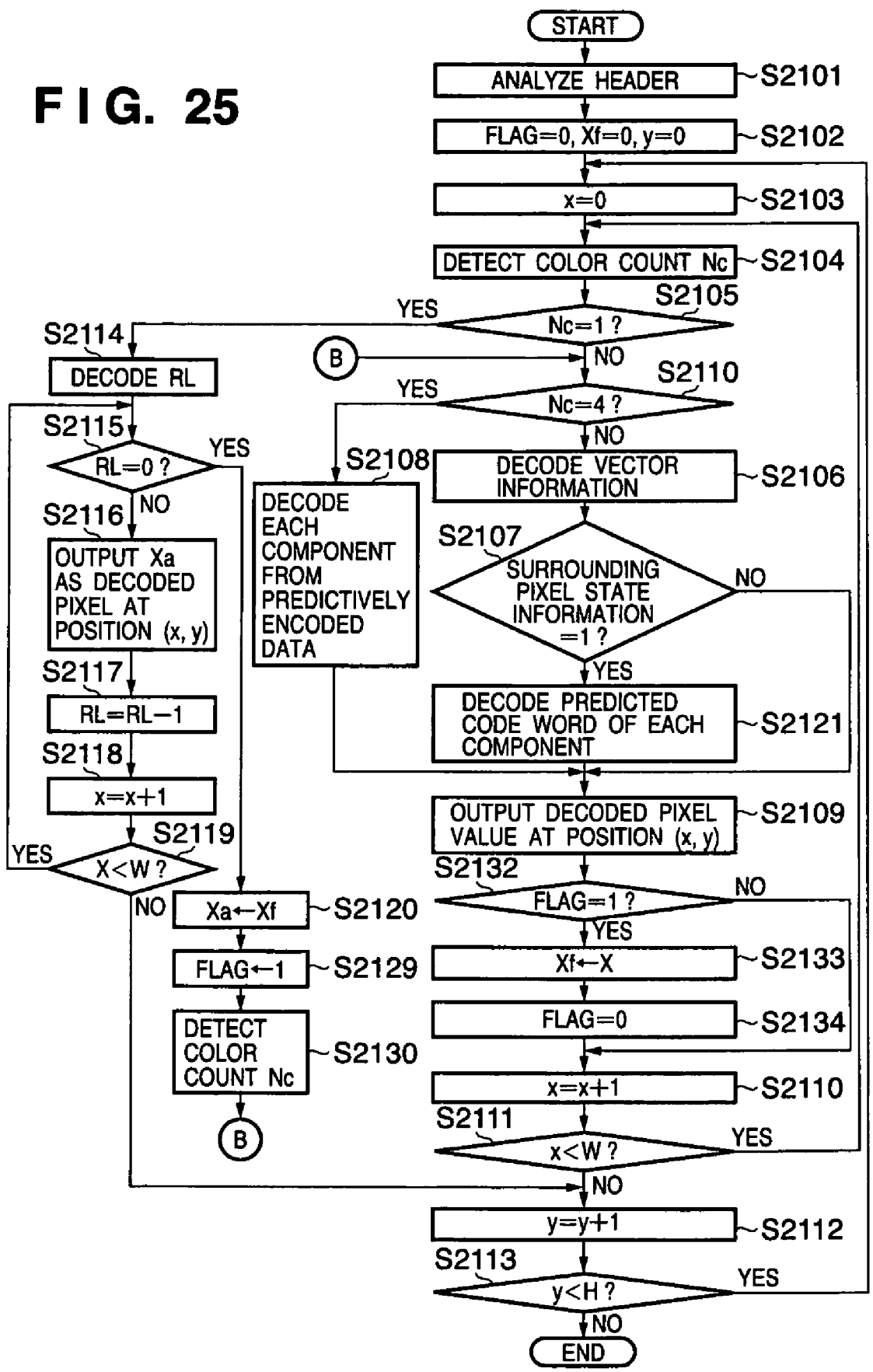
FIG. 25 is a flowchart showing decoding process procedures in the first embodiment.

A decoding process will be explained. The decoding process is basically paired with the encoding process. In this case, process procedures of decoding image data encoded by the above process will be explained with reference to the flowchart of FIG. 25. In the following description, when the pixel X of interest to be decoded is positioned on the boundary of an image, none of reference pixels "a", "b", "c", and "d" exists, and their components values are set to 0.

In step S2101, encoded data to be decoded is input to a code buffer (allocated in the RAM), and the header of the encoded data is analyzed to extract additional information necessary for decoding. The counter y which holds the vertical position of the pixel of interest is set to 0 (step S2102). At this time, R, G, and B data of the reference pixel Xf are initialized to 0, and a flag FLAG is initialized to "0" (step S2102). The flag FLAG is allocated in the RAM, and used to determine whether a run-length code word is decoded.

In step S2103, the counter x which holds the horizontal position of the pixel of interest is set to 0 (step S2103).

Attention is given to a pixel positioned at coordinates (x,y), and the color count Nc is obtained by referring to decoded surrounding pixels Xa, Xb, Xc, and Xd (step S2104). If the pixel of interest is positioned at the upper left corner of the image, Xa, Xb, Xc, and Xd are treated as "0".

In step S2105, it is determined whether the color count Nc is "1". If the color count Nc is 1 (YES in step S2105), the process shifts to step S2114; if NO, to step S2110.

In step S2110, the color count NC is compared with 4. If Nc=4, the pixel of interest is predictively encoded component value data (encoded data in FIG. 8C), and each component of the pixel of interest is decoded (step S2108).

If it is determined in step S2110 that Nc≠4, the pixel of interest is the code word of vector information, and the code word is decoded into the vector information in step S2106. Decoding of the code word of the vector information uses a table corresponding to the number of colors, as shown in FIGS. 15A to 15C.

If the obtained vector information coincides with the color count Nc, neighboring pixel state information "1" is generated; if they do not coincide with each other, "0" is generated. It is determined in step S2107 whether the neighboring pixel state information is "1" (see FIG. 12). When the neighboring pixel state information is "1", encoded data of the pixel of interest has the data structure in FIG. 8B. When the neighboring pixel state information is "0", encoded data of the pixel of interest has the data structure in FIG. 8A.

If, therefore, the neighboring pixel state information is "1", the predicted code words of the components follow the code word of the vector information, and are decoded in step S2121.

If the process advances from step S2108 or S2121 to step S2109, the results of decoding the predictively encoded data of the components are output as data of the pixel of interest. If NO in step S2107, corresponding pixel data among the pixels "a", "b". "c", and "d" is output as data of the pixel of interest in accordance with the decoded vector information.

In step S2132, it is determined whether the flag FLAG is "1". In this description, the flag FLAG=0. If the flag FLAG=0, the process advances to step S2110 to increment by one the counter x which holds the horizontal position of the pixel of interest. In step S2111, the counter x is compared with the horizontal pixel count W of the image. If x<W (YES in step S2111), the process returns to step S2104 to perform the decoding process for the next pixel. If x≧W, the process shifts to step S2112.

If it is determined in step S2105 that the color count Nc is 1, the encoded data of interest is run length-encoded data, and the process advances to step S2114 to decode the run length RL. It should be noted that the decoding result may be "0" run.

The decoded run length RL is compared with 0 (step S2115). If RL=0 (YES in step S2115), the process shifts to step S2120.

If it is determined in step S2115 that RL≠0, Xa is output as a decoded pixel value (step S2116). The counter RL is decremented by one (step S2117), and the counter x which holds the horizontal position of the pixel of interest is incremented by one (step S2118). In step S2119, the counter x is compared with the horizontal pixel count W. If x<W, the process returns to step S2115; if x≧W, the process shifts to step S2112 (step S2119).

If it is determined in step S2115 that RL=0, the process shifts to step S2120 to temporarily replace data of the pixel Xa immediately before the pixel X of interest with data of Xf. In step S2129, the flag FLAG is set to "1" in order to represent that the run-length code word has been decoded. The process advances to step S2130 to count the color count Nc on the basis of Xf, Xb, Xc, and Xd, and then returns to step S2110.

If the process returns from step S2130 to step S2110, the above-described process from step S2110 is performed to decode the pixel X of interest. After that, in step S2132, it is determined that the flag FLAG is "1". The pixel data Xf is updated with the decoded component values of the pixel X of interest in step S2133, and the flag FLAG is set to "0" in step S2134.

In step S2112, the counter y which holds the vertical position of the pixel of interest is incremented by one, and compared with the vertical pixel count H of the image. If y<H (YES in step S2113), the process returns to step S2103 to similarly process each pixel on the next line. If y≧H (NO in step S2113), the decoding process for the target image data ends (step S2113).

By the above process, encoded data in the first embodiment can be losslessly decoded to reconstruct original image data.

Second Embodiment

In the first embodiment, when the pixel X of interest ends the run and a predicted value for predictive encoding is obtained, "f", "b", and "c" are used by replacing the pixel "a" in the reference pixels "a", "b", and "c" with the reference pixel "f" which ends the run in previous run-length encoding. In the second embodiment, a plurality of colors of pixels which end runs before the pixel X of interest are stored as reference pixels "f", and a pixel whose color appears frequently is referred to.

The second embodiment will explain an example of implementing this process by a computer program. The apparatus configuration is the same as that in FIG. 14.

Figure 19:
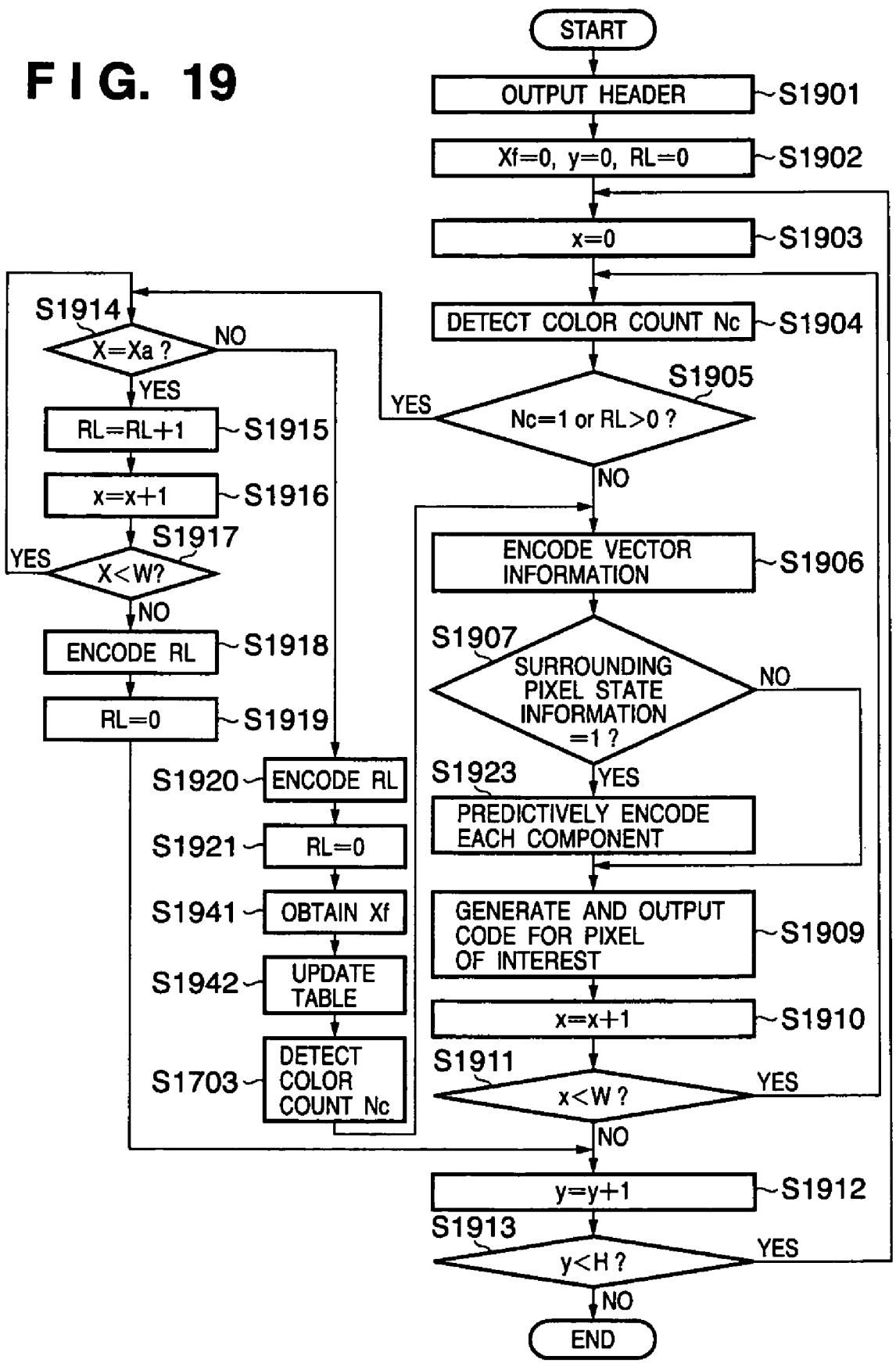
FIG. 19 is a flowchart showing encoding process procedures according to the second embodiment.

Process procedures are shown in the flowchart of FIG. 19. The flowchart in FIG. 19 is different from that in FIG. 17 in that steps S1701 and S1702 in FIG. 17 are replaced with steps S1941 and S1942, a table which holds the component values and appearance frequency of an appearance color is allocated in a RAM 1402 prior to the start of encoding, and at the start of encoding, R=G=B=0 is saved in the table and the frequency is set to "1". A process of allocating and initializing the table is executed in, e.g., step S1902.

FIG. 20 shows the state of the table when the encoding process proceeds to a certain stage. This table holds appearance color data in the descending order of the frequency. When a new color appears, color components representing the color are added and registered, and the appearance frequency is set to "1".

Since the flowchart of FIG. 19 is the same as that of FIG. 17 except for steps S1941 and S1942, steps S1941 and S1942 will be described.

The process advances to step S1941 when the pixel X of interest ends the run. By looking up the table, R, G, and B data having the highest frequency among pixels of colors that end previous runs are determined as data of the pixel Xf. The process advances to step S1942, and the frequency of the color data which determines the pixel Xf is incremented by "1" to update the table. At this time, if the same color as that of the pixel X of interest does not exist, the R, G, and B values of the pixel X of interest are added to the table, and the appearance frequency is set to "1".

According to the above-described second embodiment, a pixel which most matches pixels of interest when a pixel that ends the run before the pixel of interest is encoded in accordance with neighborhood matching information is adopted as a reference pixel for the pixel of interest. The reference pixel and the pixel of interest are highly likely to match each other, and higher encoding efficiency can be expected.

Note that a decoding process is achieved by applying the concept of the table to the first embodiment, and a description thereof will be omitted.

Third Embodiment

In the third embodiment, a pixel immediately before a pixel serving as the origin of the run is referred to as the reference pixel f, instead of a pixel which ends the run before the pixel X of interest. It is promised that Xf≠Xa and the position of Xf is much closer (at least within one line) to the pixel X of interest. The probability of X=Xf rises, and higher encoding efficiency can be expected.

It should be noted that run length-encoded data in the third embodiment is used to generate the code word of the "run" itself and pixel-encoded data (one of data in FIGS. 8A to 8C) having a color at the origin of the run is always positioned immediately before the run length-encoded data, with one exception in which the pixel of interest is positioned at the start of each line of an image to be encoded.

Figure 21:
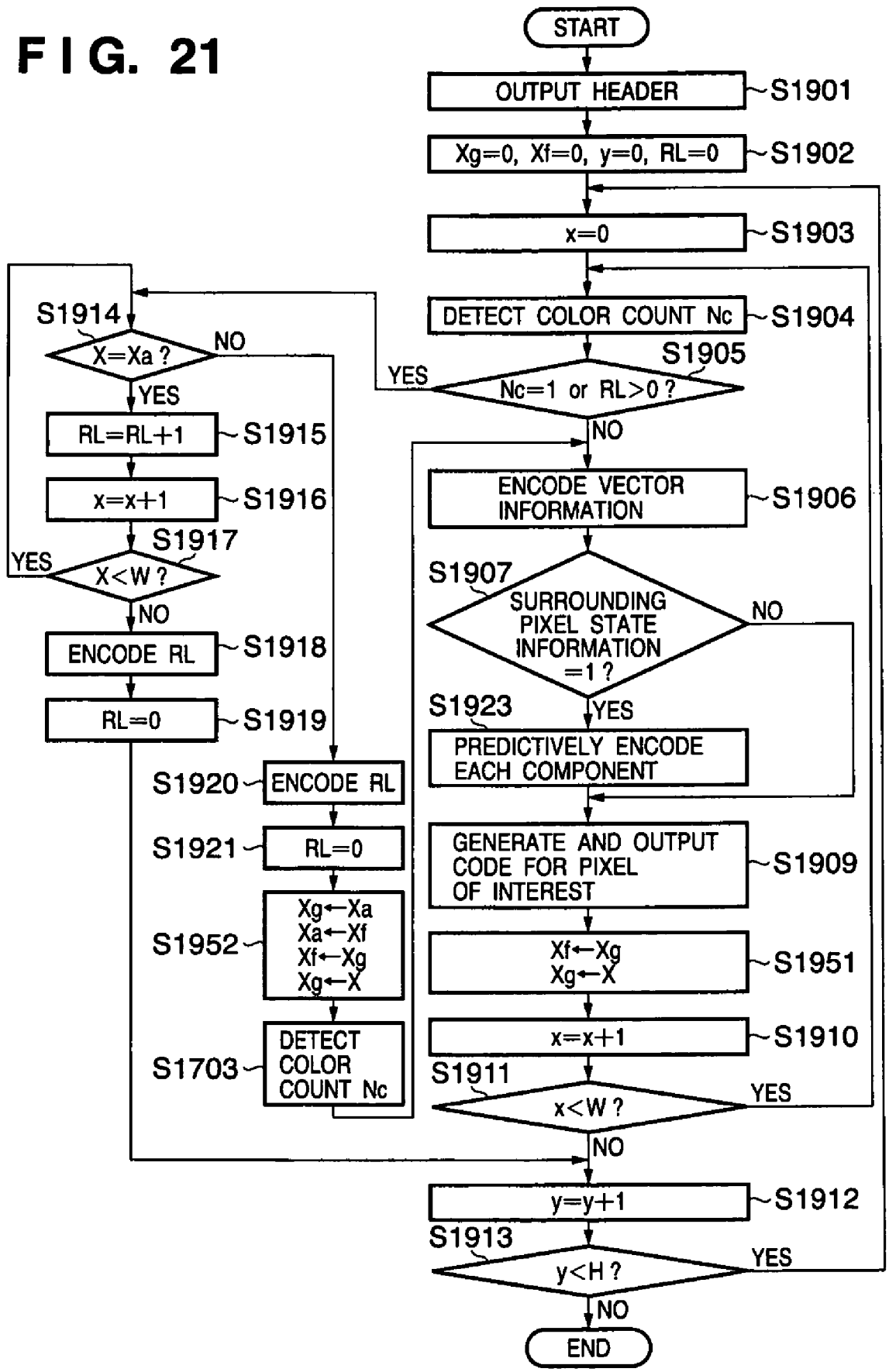
FIG. 21 is a flowchart showing encoding process procedures according to the third embodiment.

In order to store a pixel immediately before a pixel serving as the origin of the run in performing run-length encoding, the process is executed in accordance with procedures shown in FIG. 21. The flowchart in FIG. 21 is different from that in FIG. 17 in that two pixel data Xf and Xg are stored in a RAM 1402 and initialized to 0 (step S1902), and steps S1701 and S1702 are replaced with step S1952. In this case, the pixel data Xg is used to store and hold pixel data of the pixel X of interest, and Xf is used to store and hold one immediately preceding pixel data. Only processes different from those in FIG. 17 will be explained.

If the pixel X of interest ends the run, the pixel data Xa is temporarily replaced with the R, G, and B values of Xg, and the R, G, and B values of Xf are substituted into Xa in step S1952. The temporarily held values of Xg are substituted into Xf, and the R, G, and B values of the pixel X of interest are substituted into Xg. Consequently, only when the end pixel of the run is encoded, pixel data of the pixel X of interest and one immediately preceding pixel data are updated, and these values are always held. In step S1703, the color count Nc is calculated again on the basis of the updated Xa (=Xf), Xb, Xc, and Xd, and the process advances to step S1906.

Figure 22:
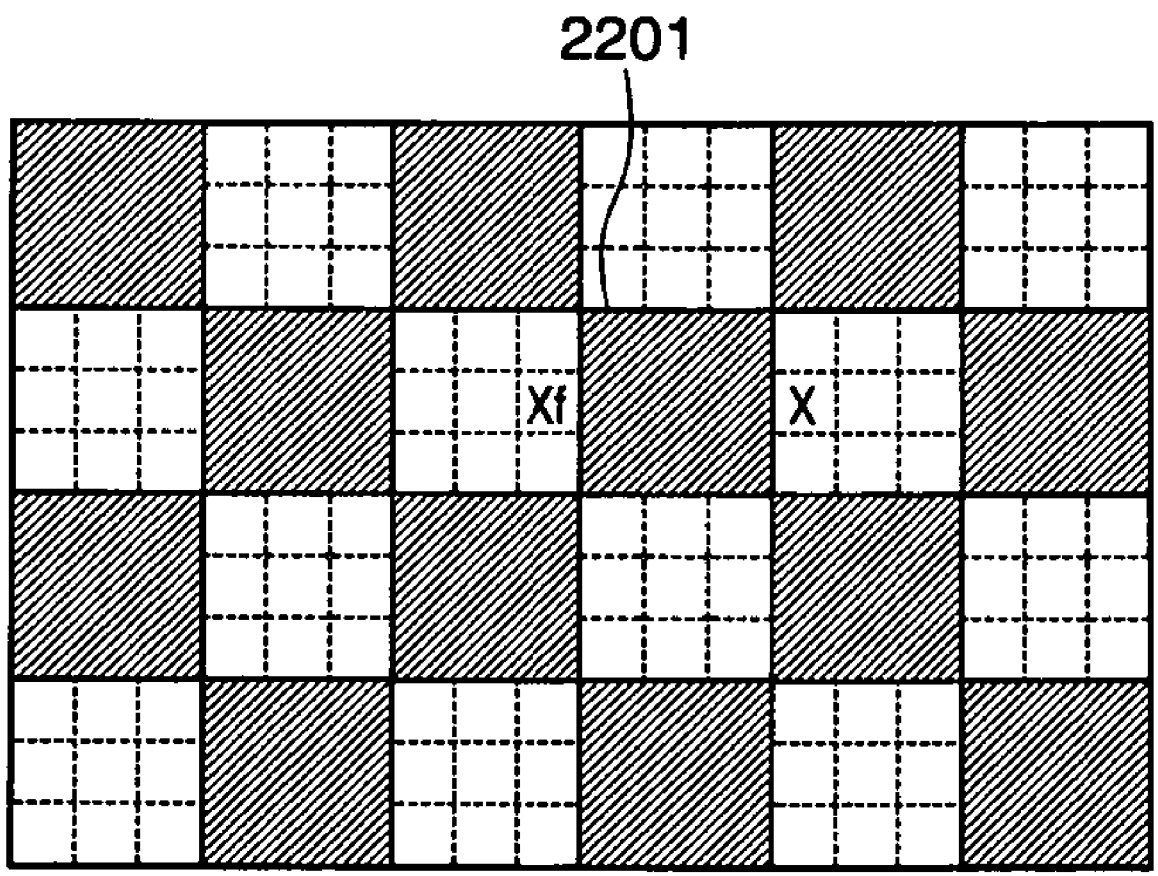
FIG. 22 is a view showing an example of an effective image in the third embodiment.

For example, when an image as shown in FIG. 22 exists, the pixel X of interest is positioned as shown in FIG. 22. In the first embodiment, a pixel 2201 in FIG. 22 is positioned at the end of the previous run and referred to, decreasing the encoding efficiency. To the contrary, in the third embodiment, the pixel Xf in FIG. 22 is referred to. It is understood that, when the R, G, and B values of the pixel X of interest are 255, 255, and 255, those of the reference pixel Xf become 255, 255, and 255, as shown in FIG. 23, and the encoding efficiency increases.

Fourth Embodiment

The first to third embodiments have been described. An example of simply executing the above embodiments without encoding vector information will be explained as the fourth embodiment.

An image processing apparatus according to the fourth embodiment comprises a predictive encoding unit which obtains the predicted value of a pixel of interest on the basis of pixels (the number of pixels may be one) at encoded pixel positions near the pixel of interest, calculates the difference between the pixel value of interest and the predicted value, and encodes the difference value, and a run-length encoding unit which counts the run of the same pixel value, and when the run ends or the pixel of interest comes to the end of the line, encodes the count value. The predictive encoding unit and run-length encoding unit are properly switched.

Image data to be encoded is image data of R, G, and B colors. Each component (color) is formed from pixel data which expresses a luminance value of 0 to 255 by 8 bits. Image data is formed by laying out pixels dot-sequentially, i.e., in the raster scan order, and each pixel is formed by laying out data in the order of R, G, and B. An image is made up of W horizontal pixels and H vertical pixels. Note that input image data is not limited to an RGB color image, and may be a CMY image (or CMYK image prepared by adding K) or a monochrome image.

Figure 26:
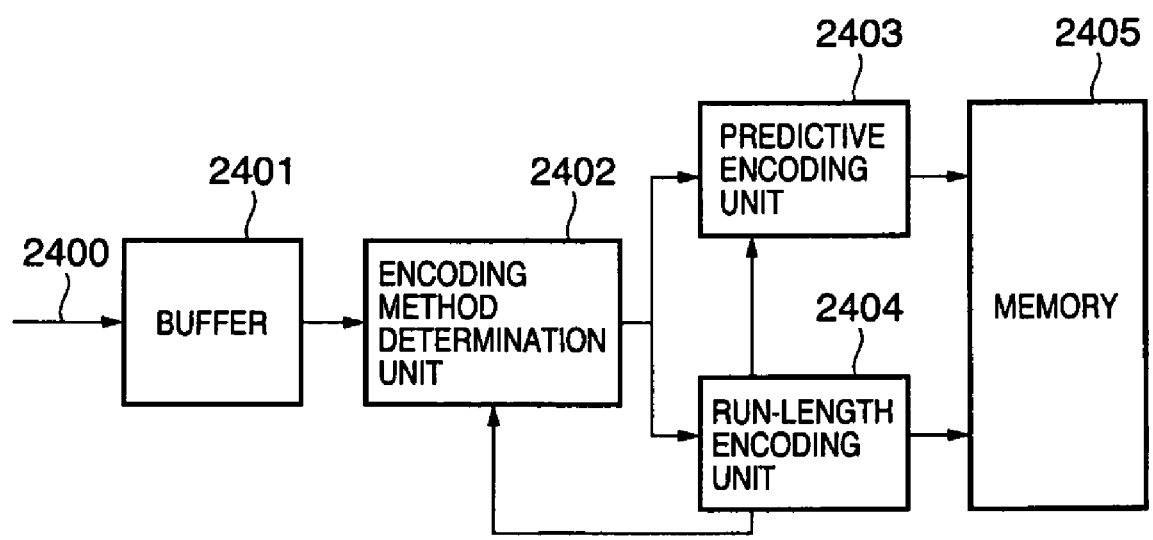
FIG. 26 is a block diagram showing an image processing apparatus according to the fourth embodiment.

FIG. 26 is a block diagram showing an image processing apparatus according to the fourth embodiment. The image processing apparatus according to the fourth embodiment comprises a buffer memory 2401 which temporarily stores image data to be encoded, an encoding method determination unit 2402, a predictive encoding unit 2403, a run-length encoding unit 2404, and a memory 2405 which stores encoded data. Of the building components shown in FIG. 26, the encoding method determination unit 2402, predictive encoding unit 2403, and run-length encoding unit 2404 may be implemented by a program which runs on the computer. This configuration is identical to that shown in FIG. 14.

Image data are input from a signal line 2400 in the raster scan order. The buffer memory 2401 has an area enough to store image data of a plurality of lines, and temporarily stores image data input from the signal line 2400.

The encoding method determination unit 2402 compares the pixel values Xa, Xb, Xc, and Xd of four encoded pixels "a", "b", "c", and "d" around a pixel X of interest, and determines whether the four surrounding pixels have the same pixel value. When the four surrounding pixels have the same pixel value, the encoding method determination unit 2402 selects the run-length encoding unit 2404 to start encoding. If the encoding method determination unit 2402 determines that the four surrounding pixels do not have the same pixel value, it selects the predictive encoding unit 2403 to perform encoding.

The predictive encoding unit 2403 encodes the R, G, and B components of the pixel X of interest one by one. The predictive encoding unit 2403 generates a predicted value p by a prediction equation: p=a+b−c from three surrounding pixels "a", "b", and "c". Similar to the first embodiment, the predictive encoding unit 2403 Huffman-encodes a difference value e between the predicted value p and a component value of interest in the pixel X of interest, and outputs the result to the memory 2405.

When the four pixels around the pixel X of interest have the same pixel value, the run-length encoding unit 2404 starts measuring the run of pixels X of interest which match immediately preceding pixels. Once measurement of the run starts, the run-length encoding unit 2404 keeps measuring the run regardless of the states of four pixels around the pixel of interest as far as the pixel X of interest matches an immediately preceding pixel. When the pixel X of interest becomes different from an immediately preceding pixel or the pixel of interest comes to the end of the line (the end of the run is determined), the run-length encoding unit 2404 encodes the measured run, outputs the run length-encoded data to the memory 2405, and ends run-length encoding. When the run-length encoding unit 2404 outputs the run length-encoded data to the memory 2405, it notifies the encoding method determination unit 2402 of the end of run-length encoding. In response to this, encoding of the pixel of interest switches to that by the predictive encoding unit 2403.

A case wherein the value of the pixel X of interest becomes different from the pixel value of an immediately preceding pixel and the run-length encoding unit 2404 ends the run will be examined.

As is apparent from FIG. 3, X≠a in this situation. Hence, if the predicted value p used to predictively encode the pixel X of interest is calculated by p=a+b−c, the prediction error is unlikely to be "0", and the encoding efficiency is likely to decrease (especially in a mode in which only the immediately preceding pixel "a" is referred to as the predicted value p, the prediction error does not become "0"). Immediately after run-length encoding switches to predictive encoding, the predicted value p is calculated not by referring to "a" which is one of three surrounding pixels "a", "b", and "c" referred to in normal prediction error, but by referring as "a" to the pixel value Xf of the final pixel in previous run-length encoding. That is, p=Xf+b+c. By using the predicted value p, the difference value e from the pixel X of interest is obtained and predictively encoded. For this purpose, when the encoding method determination unit 2402 is notified by the run-length encoding unit 2404 that run length-encoded data has been output, it stores and holds the pixel value of the pixel X of interest. Upon reception of this notification, the encoding method determination unit 2402 outputs, to the predictive encoding unit 2403, the pixel value Xf which has been held in response to a previous notification, instead of the pixel values of "a", "b", and "c" for calculating a predicted value.

Note that the stored/held pixel X is a pixel immediately after the end of run-length encoding in the above description, but the present invention is not limited to this. For example, another pixel which is referred to in predictive encoding to expect higher encoding efficiency, such as a pixel immediately before the start of a pixel stream steam during run-length encoding, may be referred to. In this case, the value of another neighboring pixel is stored and held. Also, in the above description, another pixel is temporarily referred to instead of "a" which is one of surrounding pixels, but the number of alternative pixels is not limited to one. For example, two other pixels may be temporarily referred to in place of the two pixels "a" and "b". Alternatively, the average of two other pixels may be calculated instead of "a" which is one of surrounding pixels. When the pixel X of interest ends the run, i.e., X≠Xa, the pixel value Xa of a pixel immediately before the pixel X of interest may be stored as Xf.

As described above, in the fourth embodiment, at least one of three surrounding pixels "a", "b", and "c" is not referred to immediately after run-length encoding. The predicted value p is calculated using another pixel value near a portion having undergone run-length encoding or near a portion during run-length encoding. The difference value e between the predicted value p and the pixel of interest is obtained and predictively encoded.

Figure 27:
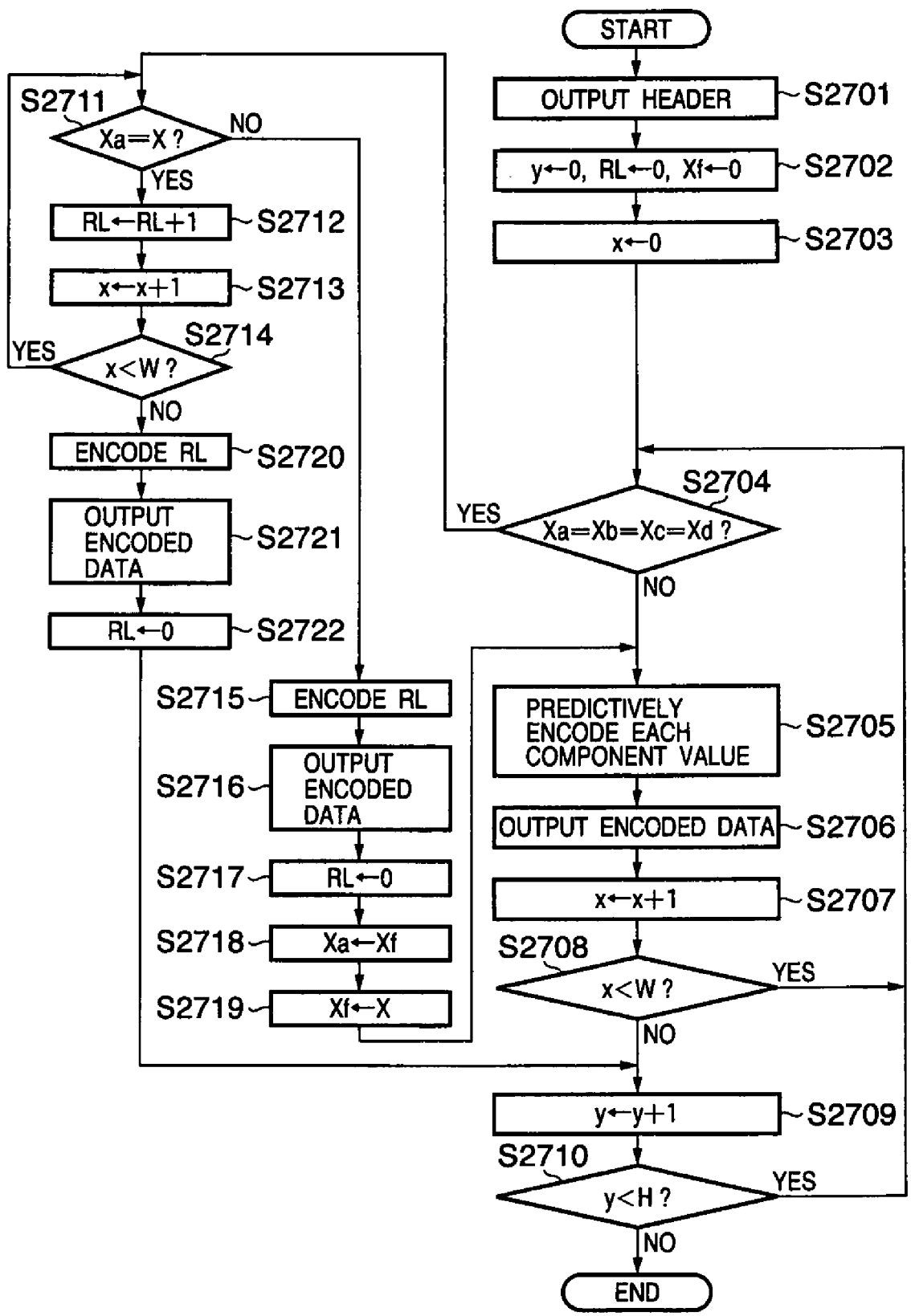
FIG. 27 is a flowchart showing encoding process procedures according to the fourth embodiment.

The flow of an encoding process in the fourth embodiment will be explained with reference to the flowchart of FIG. 27.

In step S2701, a header is generated and output in generating encoded data. In step S2702, a variable y representing the vertical position of the pixel of interest is initialized to "0". A counter variable RL which counts the run is initialized to "0", and a variable Xf which holds a predicted value used immediately after switching from run-length encoding to predictive encoding is initialized to "0". In step S2703, a variable x representing the horizontal position of the pixel of interest is initialized to "0".

In step S2704, it is determined whether the pixel values Xa, Xb, Xc, and Xd of four pixels around the pixel X of interest represented by coordinates (x,y) are equal. If it is determined that the pixel values Xa, Xb, Xc, and Xd are different, the process advances to step S2705 to predictively encode each component. In step S2706, the encoding result is output. As described above, when a surrounding pixel is outside an image to be encoded, each component value of the pixel is set to 0.

In step S2707, the variable x is incremented by "1". In step S2708, the value of the variable x is compared with the number W of horizontal pixels of an input image to determine whether the pixel of interest exceeds the end of one line. If x<W is determined, the process from step S2704 is repeated; if x≧W is determined, the variable y is incremented by "1" in step S2709 in order to encode the next line. In step S2710, the variable y is compared with the number H of vertical pixels of the input image to determine whether encoding of the final line is completed. If y<H is determined, the process from step S2703 is repeated; if y≧H is determined, the encoding process ends.

If it is determined in step S2704 during the process that four encoded pixels around the pixel X of interest have the same pixel value, the process advances to step S2711 in order to switch the above-described predictive encoding process to run-length encoding.

In step S2711, it is determined whether the pixel X of interest and the immediately preceding pixel Xa are identical. If it is determined that the pixel X of interest and the immediately preceding pixel Xa are identical, the counter variable RL is incremented by "1" in step S2712. In step S2713, the variable x is also incremented by "1" in order to set the next pixel as the pixel of interest. After that, whether "x<W" is determined in step S2714. If x<W is determined, the process from step S2711 is repeated.

If the pixel X of interest is different from the immediately preceding pixel Xa, the run ends, and the process advances from step S2711 to step S2715 to encode the value of the counter variable RL. The encoding result is output in step S2716, and the counter RL is initialized to "0" in step S2717. In order to predictively encode the pixel X of interest which is determined to be X≠Xa, Xf is set instead of Xa so as to calculate the predicted value p. Accordingly, the predicted value p is given by Xf+Xb−Xc. In step S2719, the value of the pixel X of interest is substituted into f in order to hold a predicted value immediately after the next run-length encoding switches to predictive encoding. Then, the process advances to step S2705. It should be noted that when the process advances to step S2705, the predicted value p for the pixel X of interest utilizes Xf+Xb−Xc.

If x≧W is determined in step S2714, this means that the position of the pixel X of interest exceeds the end of one line. Thus, the process advances to step S2720 to encode the value of the counter variable RL. The encoding result is output in step S2721, the counter variable RL is reset to "0" in step S2722, and the process advances to step S2709.

As described above, according to the fourth embodiment, encoded data can be successfully generated by appropriately switching between the predictive encoding process and the run-length encoding process. Immediately after the run-length encoding process switches to the predictive encoding process, not a pixel value at a position immediately before the pixel of interest, but a pixel value serving as the end of the run in previous run-length encoding is used as a predicted value in predictive encoding. This can also suppress a decrease in encoding efficiency.

Other Embodiment

In the above embodiments, image data to be encoded is data of R, G, and B components each by 8 bits. However, data representing the color space is not limited to R, G, and B, but may be Y, M, C, and K (blacK), L*a*b*, or YCbCr. Each component value need not always be an 8-bit value. Particularly, some recent digital cameras and the like internally process R, G, and B by 12 bits, and losslessly encode the data in the RAW mode. The present invention can also be applied to such an apparatus.

In the above embodiments, matches/mismatches with Nc pixel values are encoded in accordance with the color count Nc of surrounding pixels. As the vector information, a symbol of Nc+1 is encoded. For example, the symbols of four values are encoded using the code table in FIG. 15C such that when the color count Nc is 3, the symbol is 0 if the pixel of interest matches the first pixel value X1; 1 if the pixel of interest matches the second pixel value X2; 2 if the pixel of interest matches the third pixel value X3; and 3 if the pixel of interest does not match any of X1 to X3. However, not all Nc pixel values need be subjected to match/mismatch determination. The symbol which takes three values of 0, 1, and 3 ("2" is excluded on purpose in consideration of a comparison between neighborhood matching information and Nc) may be encoded such that the symbol is 0 when X=X1, 1 when X=X2, and 3 when X≠X1 and X≠X2.

The method of obtaining the first, second, and third pixel values X1, X2, and X3 is not limited to the above-described embodiments. For example, the first, second, and third pixel values may be acquired in the order of Xb, Xa, Xc, and Xd, which is different from the above-described one. The order may be changed in accordance with matching between Xa, Xb, Xc, and Xd. For example, the first, second, and third pixel values are acquired in the order of Xa, Xb, Xc, and Xd. When Xa=Xb, Xd may be set as the second pixel value X2.

Encoding of vector information may use a code word which is set in advance on the assumption of the probability distribution. However, a code word different from those in the above examples may be used, or a different encoding scheme such as a scheme using an arithmetic code may be applied.

As the method of predicting the component value of interest, several prediction methods may be prepared and adaptively switched. Alternatively, nonlinear prediction may be used to feed back the average value of prediction errors generated in encoded component values to prediction of the component of interest.

The above embodiments employ Huffman encoding and Golomb encoding as entropy encoding of the prediction error of a component value. Another entropy encoding may also be adopted.

As pixel values around the pixel X of interest, Xa, Xb, Xc, and Xd are referred to. Alternatively, a larger number of pixels may be referred to, or the number of reference pixels may be decreased to, e.g., only Xa and Xb.

As is easily understood from the description of the above embodiments, the present invention can also be implemented by a computer program which is executed by a computer. In general, the computer program is stored in a computer-readable storage medium such as a CD-ROM, and can be executed by copying or installing the program in the system using a reading device such as a drive which accesses the storage medium. The computer program apparently falls within the scope of the present invention.

As has been described above, according to the present invention, data can be efficiently encoded while both encoding of each pixel and run-length encoding of encoding the run of pixels are utilized.

As many apparently widely different embodiments of the present invention can be made without departing from the spirit and scope thereof it is to be understood that the invention is not limited to the specific embodiments thereof except as defined in the claims.

This application claims the benefit of Japanese Application No. 2005-146984, filed May 19, 2005, which is hereby incorporated by reference herein in its entirety.

What is claimed is:

1. An image encoding apparatus which encodes a pixel value, comprising:
   an input unit that inputs, in a predetermined scan order, an image to be encoded:
   a first encoding unit encodes a pixel value of a target pixel using a pixel value of a pixel encoded precedent to the target pixel;
   a second encoding unit that counts, as a run, a number of pixels having the same value based on an original value, terminates the count and outputs encoded data based on the counted run if the target pixel is a run-ending pixel having a different value from an adjacent pixel; and
   a switching unit that switches between encoding by said first encoding unit and encoding by said second encoding unit,
   wherein said switching unit causes, after said second encoding unit outputs encoded data, said first encoding unit to start encoding the target pixel determined as the run-ending pixel, and
   wherein, when said switching unit switches from said second encoding unit to said first encoding unit, the target pixel is determined as the run-ending pixel, and said first encoding unit encodes the target pixel using a value of a pixel determined as the run-ending pixel other than the target pixel.

2. The apparatus according to claim 1, wherein when said switching unit switches from said second encoding unit to said first encoding unit the target pixel is determined as the run-ending pixel, said first encoding unit encodes the target pixel using a value of a pixel determined as the run-ending pixel immediately before the target pixel.

3. The apparatus according to claim 1, wherein when said switching unit switches from said second encoding unit to said first encoding unit the target pixel is determined as the run-ending pixel, said first encoding unit encodes the target pixel using a value of a pixel having the highest frequency among run-ending pixels other than the target pixel.

4. The apparatus according to claim 1, wherein said switching unit switches between encoding by said first encoding unit, encoding by said second encoding unit, and encoding by a third encoding unit.

5. An image encoding method performed by an image encoding apparatus that includes a central processing unit coupled to a memory unit storing a computer-executable program for encoding a pixel value, the method comprising:
   an inputting step of inputting, in a predetermined scan order, an image to be encoded:
   a first encoding step of encoding a pixel value of a target pixel using a pixel value of a pixel encoded precedent to the target pixel;
   a second encoding step of counting, as a run, a number of pixels having the same value based on an original value, terminating the count and outputting encoded data based on the counted run if the target pixel is a run-ending pixel; and
   a switching step of switching between encoding in the first encoding step and encoding in the second encoding step,
   wherein said switching causes, after said second encoding outputs encoded data, said first encoding to start encoding the target pixel determined as the run-ending pixel, and
   wherein, when said switching switches from said second encoding unit to said first encoding, the target pixel is determined as the run-ending pixel, and said first encoding encodes the target pixel using a value of a pixel determined as the run-ending pixel other than the target pixel having a different value from an adjacent pixel.

6. An image encoding apparatus which encodes a pixel value, comprising:
   an input unit that inputs, in a predetermined scan order, an image to be encoded:
   a first encoding that encodes a pixel value of a target pixel using a pixel value of a pixel encoded precedent to the target pixel;
   a second encoding unit that counts, as a run, a number of pixels having the same value based on an original value, terminates and outputs encoded data based on the counted run if the target pixel is a run-ending pixel having a different value from an adjacent pixel; and
   a switching unit that switches between encoding by said first encoding unit and encoding by said second encoding unit,
   wherein said switching unit causes, after said second encoding unit outputs encoded data, said first encoding unit to start encoding the target pixel determined as the run-ending pixel, and
   wherein, when said switching unit switches from said second encoding unit to said first encoding unit, the target pixel is determined as the run-ending pixel, and said first encoding unit encodes the target pixel using a value of a pixel immediately before the start pixel of the run immediately before the target pixel.

7. A computer-readable storage medium that stores a computer program for causing the image encoding apparatus to perform the method of claim 5.

8. An image encoding method performed by an image encoding apparatus that includes a central processing unit coupled to a memory unit storing a computer-executable program for encoding a pixel value, the method comprising:
   an inputting step of inputting, in a predetermined scan order, an image to be encoded:
   a first encoding step of encoding a pixel value of a target pixel using a pixel value of a pixel encoded precedent to the target pixel;
   a second encoding step of counting, as a run, a number of pixels having the same value based on an original value, and outputting encoded data based on the counted run if the target pixel is a run-ending pixel having a different value from an adjacent pixel; and a switching step of switching between encoding in the first encoding step and encoding in the second encoding step,
wherein said switching causes, after said outputting of the encoded data, encoding the target pixel determined as the run-ending pixel, and
wherein, when said switching switches from said second encoding to said first encoding, the target pixel is determined as the run-ending pixel, and said first encoding encodes the target pixel using a value of a pixel immediately before the start pixel of the run immediately before the target pixel.

* * * * *